(12) United States Patent
Tuttle et al.

(10) Patent No.: US 9,359,266 B2
(45) Date of Patent: Jun. 7, 2016

(54) SYSTEMS AND METHODS FOR CONVERTING AND PROCESSING ORGANIC SLUDGES FOR MULTI-NUTRIENT SINGLE ACCRETED GRANULE ENHANCED EFFICIENCY FERTILIZER PRODUCTION

(71) Applicant: Unity Fertilizer LLC, Pasadena, TX (US)

(72) Inventors: Roger E. Tuttle, Pennsburg, PA (US); David A. Weber, St. Petersburg, FL (US); W. Dennis Moran, Scituate, MA (US)

(73) Assignee: UNITY FERTILIZER LLC, Miami Beach, FL (US)

( * ) Notice: Subject to any disclaimer, the term of this patent is extended or adjusted under 35 U.S.C. 154(b) by 0 days.

(21) Appl. No.: 14/376,551

(22) PCT Filed: Jan. 29, 2013

(86) PCT No.: PCT/US2013/023534
§ 371 (c)(1),
(2) Date: Aug. 4, 2014

(87) PCT Pub. No.: WO2013/116179
PCT Pub. Date: Aug. 8, 2013

(65) Prior Publication Data
US 2015/0027180 A1    Jan. 29, 2015

Related U.S. Application Data

(60) Provisional application No. 61/633,018, filed on Feb. 3, 2012.

(51) Int. Cl.
*C02F 1/66* (2006.01)
*C05F 7/00* (2006.01)
(Continued)

(52) U.S. Cl.
CPC ... *C05F 7/00* (2013.01); *B01F 5/12* (2013.01); *B01F 15/00* (2013.01);
(Continued)

(58) Field of Classification Search
None
See application file for complete search history.

(56) References Cited

U.S. PATENT DOCUMENTS 4,098,006 A * 7/1978 Maffet ............................ 34/389
4,121,349 A * 10/1978 Maffet ............................ 34/389
(Continued)

FOREIGN PATENT DOCUMENTS

| KR | 10-2005-0088952 A | 9/2005 |
| WO | WO 01/68562 A2 | 9/2001 |
| WO | WO 2006/091645 A2 | 8/2006 |

OTHER PUBLICATIONS

Sharma et al., A Case Study at G.N.F.C. IFA Technical Conference. Oct. 1, 2000. [retrieved on Mar. 5, 2003]. Retrieved from the Internet. <URL: http://www.fertilizer.org/ifa/HonnePage/LIBRARY/Publication-database.html/Study-and-Evaluation-of-Hygroscopic-Behaviour-of-Phosphatic-Fertilizers-Ammonium-Nitrophosphate-ANP-and-Calcium-Ammonium-Nitrate-CAN-by-Using-Different-Anticaking-Agents-at-80-90-RH.-A-Case-Study-at-FNFC.html>.
(Continued)

*Primary Examiner* — Wayne Langel
(74) *Attorney, Agent, or Firm* — Drinker Biddle & Reath LLP

(57) ABSTRACT

Convening dewatered heterogeneous sludge containing organic waste materials into a homogenous extract of carbon and amino acids for fertilizer production by adding sulfuric acid to the sludge; pumping the mixture through a blending mixer to mix the sludge with the sulfuric acid; adding conditioning chemicals to the mixture: pumping the mixture through a shearing mixer to mix the conditioning chemicals into the mixture; and mechanically agitating the mixture to create the homogenous extract. Optionally, the extract is pumped into a pipe reactor for reaction with an acid and a base to form a melt, which is rolled onto fertilizer particles to form accreted granules. The accreted granules are dried to form a granular fertilizer. Also described is an organically-enhanced granular nitrogen-phosphorous-sulfur fertilizer having at least about 0.5% by weight total carbon and amino acids, and accreted granule size greater than or equal to about 1.7 mm. The fertilizer is noncombustible.

30 Claims, 11 Drawing Sheets

(51) Int. Cl.
*B01F 5/12* (2006.01)
*B01F 15/00* (2006.01)
*B01F 15/02* (2006.01)

(52) U.S. Cl.
CPC ........ *B01F 15/0243* (2013.01); *B01F 15/0247* (2013.01); *B01F 15/0283* (2013.01); *C02F 1/66* (2013.01); *B01F 2215/0055* (2013.01)

(56) References Cited

U.S. PATENT DOCUMENTS

| | | | |
|---|---|---|---|
| 4,193,206 A * | 3/1980 | Maffet | 34/385 |
| 5,984,992 A * | 11/1999 | Greer et al. | 71/11 |
| 6,210,625 B1 | 4/2001 | Matsushita et al. | |
| 6,800,109 B1 | 10/2004 | Carlen et al. | |
| 6,966,941 B1 * | 11/2005 | Grobler et al. | 71/11 |
| 7,128,880 B2 * | 10/2006 | Dahms et al. | 422/129 |
| 7,947,104 B2 * | 5/2011 | Burnham et al. | 71/11 |
| 8,470,065 B1 * | 6/2013 | Burnham | 71/11 |
| 2002/0153307 A1 | 10/2002 | Blais et al. | |
| 2002/0185456 A1 * | 12/2002 | Ward | C02F 11/18 210/766 |
| 2004/0120867 A1 | 6/2004 | Dahms et al. | |
| 2005/0175516 A1 | 8/2005 | Grobler et al. | |
| 2006/0243009 A1 * | 11/2006 | Burnham | 71/11 |
| 2006/0254331 A1 * | 11/2006 | Burnham | 71/11 |
| 2007/0062233 A1 * | 3/2007 | Burnham | 71/11 |
| 2008/0000279 A1 | 1/2008 | Faulmann et al. | |
| 2008/0034822 A1 * | 2/2008 | Burnham et al. | 71/12 |
| 2011/0154873 A1 * | 6/2011 | Burnham et al. | 71/8 |
| 2011/0209252 A1 | 8/2011 | King et al. | |
| 2011/0265532 A1 * | 11/2011 | Burnham et al. | 71/8 |
| 2012/0247164 A1 * | 10/2012 | Dahms et al. | 71/8 |
| 2015/0020560 A1 * | 1/2015 | Burnham | 71/13 |
| 2015/0101374 A1 * | 4/2015 | Burnham et al. | 71/8 |

OTHER PUBLICATIONS

International Search Report (PCT/US2013/023534) ISA/US Apr. 1, 2013.
Extended European search report dated Nov. 16, 2015 issued in corresponding European Patent Application No. 13 74 3308 (9 pages).

* cited by examiner

SYSTEMS AND METHODS FOR CONVERTING AND PROCESSING ORGANIC SLUDGES FOR MULTI-NUTRIENT SINGLE ACCRETED GRANULE ENHANCED EFFICIENCY FERTILIZER PRODUCTION

TECHNICAL FIELD

The disclosure relates to systems and methods for processing and converting organic sludges (i.e., heterogeneous organic waste material) into precursors including carbon and amino acids extracted from organic wastes, such as, municipal wastewater treatment waste sludge and swine manure for the production of multi-nutrient single accreted granule enhanced efficiency fertilizers, and multi-nutrient single accreted granule enhanced efficiency fertilizers that minimize nitrogen losses from land to atmosphere and land to water and meet new regulations for Nutrient Management as required by the United States Environmental Protection Agency and the United States Department of Agriculture.

BACKGROUND

Agricultural studies by the University of Illinois soil scientists have shown "that nitrogen fertilizers deplete Soil Organic Carbon while causing a decrease in corn growth and yield." Researchers from Rice University and Michigan State University have shown "that over-fertilization of corn with nitrogen fertilizer reduces ethanol production." Researches from the University of Zurich determined that "soils store three times as much carbon as plants and the atmosphere. Soil organic matter plays a key role in the global carbon cycle as it stores significant amounts of carbon and thus counters global warming and the Kyoto Protocol permits signatory countries to count soils as so-called carbon sinks." The Chartered Institute of Water and Environmental Management issued a Position Statement regarding "the need for recycling phosphorus from wastewater treatment plants." Agronomists throughout the world have determined that "there is a major sulfur deficiency in farm soils and the lower the soil carbon the more likely sulfur deficiencies occur." Nutritionists and agronomists determined "that there is major global zinc deficiency in most soils which causes decreases in crop yields and serious zinc deficiencies in children." The application rates for zinc are relatively small therefore it is almost impossible to apply an even spread over each farm acre. To add organic material from sewage sludge and animal manures require a product that has similar or better physical and chemical characteristics than commercial fertilizers for which there are specific standards. However, most or all of the products produced from sewage sludge and animal manures cannot be transported, stored or applied through the established standard distribution fertilizer infrastructure. The majority of the farmers and food security advisors, testing associations and laboratories require that sewage sludge and/or animal manures be sterilized before use on food chain crops. IFDC, the leader in independent fertilizer pilot plant production and crop research conducted a major study to determine the leaching and volatilization characteristics of urea and multi-nutrient single accreted granule enhanced efficiency fertilizer produced through the present process. The results provided significant differences and showed that the multi-nutrient single accreted granule enhanced efficiency fertilizers leached and volatilized significantly less than urea therefore providing more nutrients in the crop root zones at reduced fertilizer costs.

Primary, secondary and/or tertiary wastewater treatment facilities exist for domestic (e.g., serving municipalities, cities, counties, authorities), livestock (e.g., treating swine, cattle, chicken wastes), commercial and industrial (e.g., treating pharmaceutical processing, food processing, and the like) wastewater which produce a liquid stream and solid waste material. These wastewater treatment facilities produce organic solid waste material in the form of undigested sludges, digested sludges, partially digested sludges, liquid sludges, dewatered sludges, and the like.

Wastewater treatment facilities typically treat and then separate liquid waste streams from the organic waste material. Initially, the organic waste material typically has a solids content of about 0.5% to about 10% by weight, and is referred to as liquid sludge. The liquid sludge can be dewatered using various types of dewatering equipment including but not limited to vacuum filters, screw presses, plate and frame presses, belt filter presses and centrifuges to form a dewatered sludge having a typical solids content of about 13% to about 45% by weight.

Chemical dewatering polymers are used to maximize the water release from the organic waste material during dewatering. Chemical dewatering polymers are synthetic, organic flocculants that act on the solids' electrical charges to increase coagulation bonds that enhance water release from the organic sludge solid waste material and result in increased solids concentration in the dewatered material. The chemical dewatering polymers create a dewatered material with high viscosity characteristics resulting in a material that is non-fluid, and thus difficult to pump, and which continues to have low oxidation reduction potential (ORP) and can be odorous.

Traditional fertilizer manufacturing processes exist for generating and/or mixing and blending a fertilizer(s) (e.g., Monoammonium Phosphate (MAP), Diammonium Phosphate (DAP), Ammonium Sulfate (AS), Ammonium Phosphate Sulfate, NPK blends) through steps that can include reacting a material or materials, granulating the reacted material with or without other fertilizer liquids or solids, and drying the granulated material or mixed or blended materials.

The industrialized and developing countries throughout the world all have a significant need to increase crop production, increase crop yields along with crop quality, and reduce fertilizer nitrogen leaching and volatilization while recycling phosphorous and organic waste material generated by humans and animals. The organic waste material is generated principally from sludges received from domestic wastewater treatment facilities, livestock manure treatment facilities, and industrial wastewater treatment facilities. Dewatered sludge produced by such facilities is generally viscous (typical viscosity in excess of 500,000 centipoise and up to 2,000,000 centipoise), which makes it difficult to produce a fluid, odor-free, combustion-free consistent product directly from dewatered sludge. Products that are produced directly from dewatered sludge are generally of poor quality, and generally do not meet commercial fertilizer standards as defined in the Manual for Determining Physical Properties of Fertilizer 2nd Edition (International Fertilizer Development Center (IFDC) February, 1993) and Association of American Plant Food Control Officials (AAPFCO) standards. In addition, because the dewatered sludge is generated from a variety of different facilities, each having potentially different waste streams and treatment processes, the dewatered sludge is generally heterogeneous in nature.

The following are some of the major chemical, biological, physical, economic, logistical and operational problems of existing wastewater treatment facilities that prevent the efficient and profitable recycling of organic waste material:

inability to process waste materials from multiple, varied sources; inability to substantially eliminate pathogens, and odor in treated materials; inability to produce a treated material that is flowable; and/or inability to produce a dust-free, odor-free, combustion-free treated material that is homogenous; inability to produce fertilizer that meets the specifications of commercial fertilizer, and further in the Manual for Determining Physical Properties of Fertilizer, 2nd Edition and Association of American Plant Food Control Officials (AAPFCO) standards.

There is a need in the art for an efficient process to alleviate all of these issues and problems. The present process and pipe-reactor granulation system produce multi-nutrient single accreted granule enhanced efficiency fertilizers that overcome these issues and problems. The multi-nutrient single accreted granule enhanced efficiency fertilizer produced through the present process and the pipe-reactor granulation system extracts carbon and amino acid from organic wastes and utilizes them as precursors to produce the new generation "Enhanced Efficiency Fertilizers." The present process using pipe reactor granulation equipment is vital and necessary to complete chemical conversion and sterilization for the production of multi-nutrient single accreted granule enhanced efficiency fertilizers.

SUMMARY

In one embodiment, a process is described for converting a dewatered heterogeneous sludge containing organic waste materials into a homogenous extract of carbon and amino acids to be used in a pipe-reactor granulator fertilizer production process. The conversion process comprises the steps of pumping a heterogeneous dewatered sludge including from about 13% to about 45% solids; adding sulfuric acid to the sludge in an amount sufficient to cause the pH of the resultant mixture to be less than about 1; pumping the mixture through at least one in-line static blending mixer to mix the sludge with the sulfuric acid to reduce the viscosity of the mixture to less than about 5,000 centipoise; adding conditioning chemicals to the mixture; pumping the mixture through at least one in-line static shearing mixer to mix the conditioning chemicals into the mixture, to substantially sterilize the mixture of pathogens, and to substantially eliminate lumps in the mixture; and mechanically agitating the mixture for an aging time to create the homogenous extract.

In another embodiment, a sludge conversion system is described for converting a heterogeneous sludge containing organic waste materials into a homogeneous extract of carbon and amino acids to be used in a pipe-reactor granulator fertilizer production system. The conversion system comprises a positive displacement pump configured to pump a dewatered sludge including from about 13% to about 45% solids; at least one in-line static blending mixer configured to receive the sludge from the pump and to mix the sludge with sulfuric acid to reduce the pH of the resultant mixture to less than about 1 and the viscosity of the resultant mixture to less than about 5,000 centipoise; at least one in-line static shearing mixer configured to receive the mixture from the static blending mixer and to mix the mixture with conditioning chemicals, to substantially sterilize the mixture of pathogens, and to substantially eliminate lumps in the mixture; an aging tank configured to receive the mixture from the in-line static shearing mixer and agitating the mixture to maintain homogeneity of the mixture while the mixture is aged to become the extract; and a transfer pump configured to deliver the extract from the aging tank to a fertilizer production system.

In yet another embodiment, a process is described for converting a dewatered homogeneous sludge containing organic waste materials into a granular fertilizer. The process comprises pumping a heterogeneous dewatered sludge including from about 13% to about 45% solids; adding sulfuric acid to the sludge in an amount sufficient to cause the pH of the resultant mixture to be less than about 1; pumping the mixture through at least one in-line static blending mixer to mix the sludge with the sulfuric acid to reduce the viscosity of the mixture to less than about 5,000 centipoise; adding conditioning chemicals to the mixture; pumping the mixture through at least one in-line static shearing mixer to mix the conditioning chemicals into the mixture, to substantially sterilize the mixture of pathogens, and to substantially eliminate lumps in the mixture; mechanically agitating the mixture for an aging time to create a homogeneous extract of carbon and amino acids; pumping the extract into a pipe-cross reactor for reaction with an acid and a base to form a melt; flashing off water from the melt as steam; rolling the melt onto recycled fine particles to form accreted granulates; and drying the accreted granules to form a granular fertilizer.

In yet another embodiment, a system is described for converting a dewatered homogeneous sludge containing organic waste materials into a granular fertilizer. The system comprises a positive displacement pump configured to pump a dewatered sludge including from about 13% to about 45% solids; at least one in-line static blending mixer configured to receive the sludge from the pump and to mix the sludge with sulfuric acid to reduce the pH of the resultant mixture to less than about 1 and the viscosity of the resultant mixture to less than about 5,000 centipoise; at least one in-line static shearing mixer configured to receive the mixture from the static blending mixer and to mix the mixture with conditioning chemicals, to substantially sterilize the mixture of pathogens, and to substantially eliminate lumps in the mixture; an aging tank configured to receive the mixture from the in-line static shearing mixer and agitating the mixture to maintain homogeneity of the mixture while the mixture is aged to become the extract; a transfer pump configured to pump the extract from the aging tank; a pipe reactor configured to receive the extract from the transfer pump and to mix the extract with an acid and a base to form a melt; a granulator configured to flash off water from the melt and to roll the melt onto fine particles to form accreted granules; and a dryer to dry the accreted granules to form a granular fertilizer.

In a further embodiment, organically-enhanced granular nitrogen-phosphorous-sulfur fertilizer is described. The fertilizer comprises at least about 0.5% by weight of total carbon and amino acids; and has an accreted granule size greater than or equal to about 1.7 mm. The fertilizer is noncombustible in a dust cloud combustibility test conducted in accordance with ASTM Standard Test Method E1226.

BRIEF DESCRIPTION OF THE DRAWINGS

For the purpose of illustration, there are shown in the drawings embodiments that are presently preferred; it being understood, however, that this invention is not limited to the precise arrangements and constructions particularly shown.

DETAILED DESCRIPTION

Figure 1:
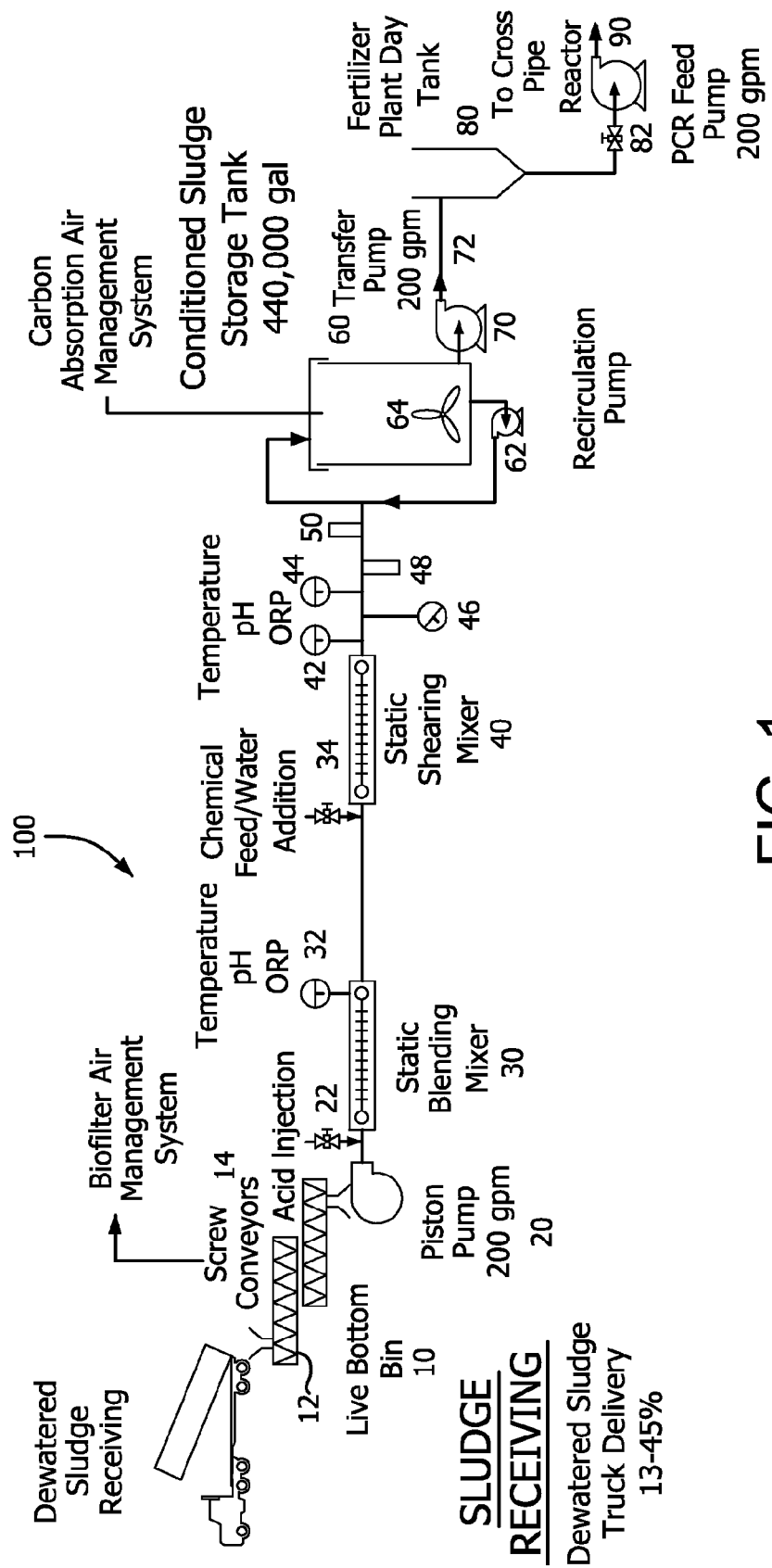
FIG. 1 is a process flow diagram of an embodiment of a system and process for converting sludge to be supplied to a granular fertilizer production system and process.
Figure 2:
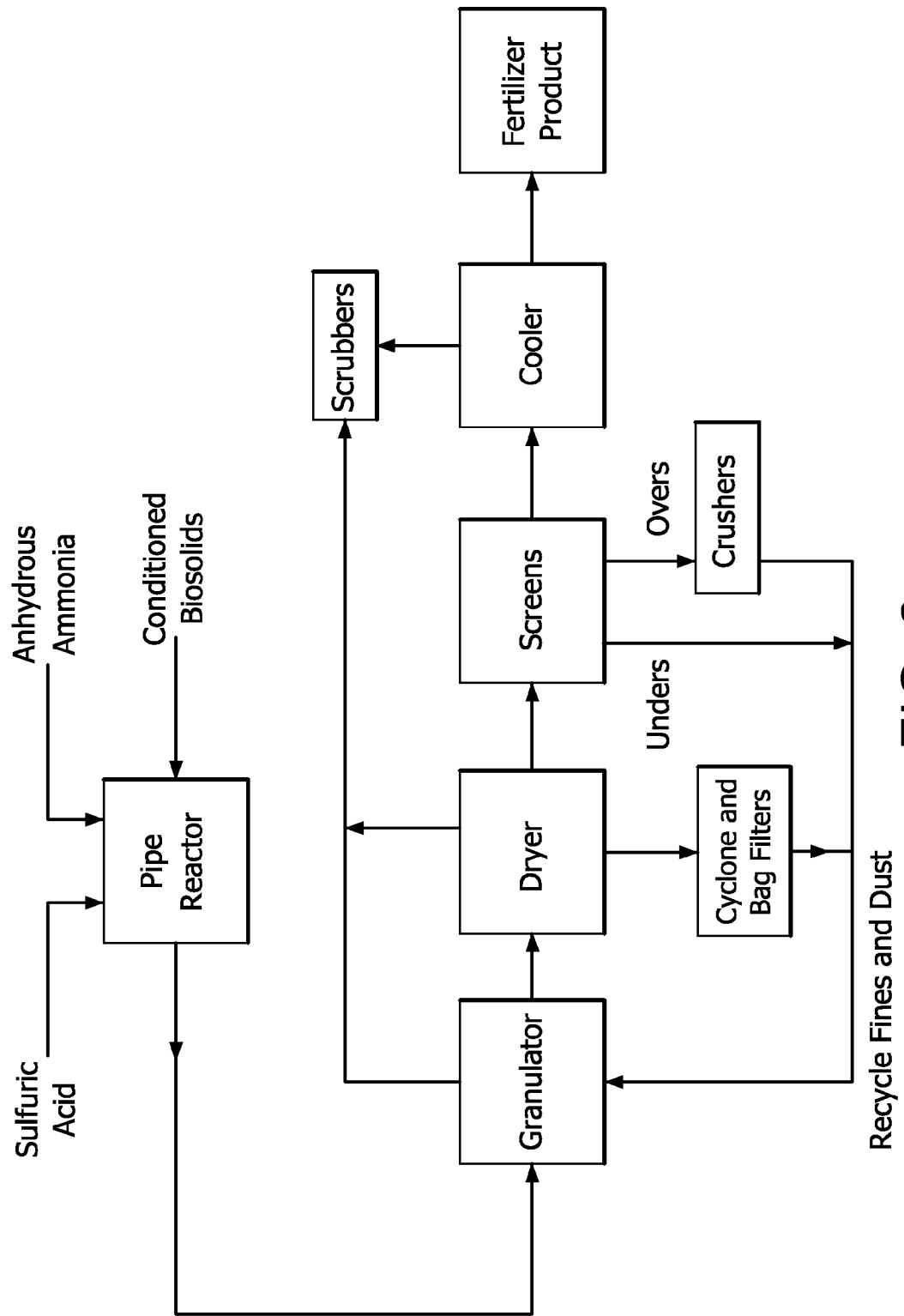
FIG. 2 is a process flow diagram of an embodiment of a system and process for making granular fertilizer using converted sludge produced from a system and process as illustrated in FIG. 1 to produce an organically-enhanced nitrogen-phosphorus-sulfur granular fertilizer.

An embodiment of a sludge conversion system and process is shown schematically in FIG. 1, and an embodiment of a fertilizer granulation system and process, using sludge converted by the sludge conversion system, is shown schematically in FIG. 2. Both processes are continuous processes, although the sludge conversion system includes an aging tank at its downstream end, so converted sludge can be held for a period of time prior to being fed to the fertilizer granulation system.

The process described herein goes against the current paradigm that treats organic waste materials by only drying them and reducing their volume. Such treatment does not eliminate pathogens or prevent combustion of the resulting dried sludge. Instead, in the process described herein, organic wastes are converted into a carbon and amino acid extract that can be used as a process additive to produce a fertilizer product that is odorless, has no detectable pathogens), and is non-combustible.

The sludge conversion system receives dewatered sludge, for example, from multiple municipal wastewater treatment plants, and converts the sludge into a homogenous extract of carbon and amino acids. The extract is then used as a feedstock ingredient and a cooling/granulation aid in the production of organically-enhanced inorganic commercial fertilizers. The extract can be used as a feedstock for existing ammonium sulfate, diammonium phosphate, mono-ammonium phosphate, and nitrogen-phosphorous-potassium production facilities to produce a range of fertilizer products. Preferably, the extract is supplied to a standard fertilizer pipe-cross reactor (PCR) granulation system to produce granular fertilizer.

The net result of the sludge conversion system is an extract that has a reduced viscosity as compared with unprocessed dewatered sludge, has essentially no odor, has substantially no combustibility components, and is free of pathogens with a NSF International certification. Sludge is known to contain 60%-80% combustibles, 30%-45% carbon, 10%-40% protein, and 5%-20% cellulose. Prior processes do little more than dry sludge by removing water. However, dried sludge remains combustible and therefore is not fit for distribution through the established standard global fertilizer distribution infrastructure. In contrast, the extract obtained by the processes disclosed herein, when used as a feedstock to a standard fertilizer pipe-cross reactor (PCR) granulation system, produces a fertilizer that is non-combustible, and so can be distributed world-wide using the established fertilizer distribution infrastructure.

In one embodiment, the sludge conversion system can receive dewatered sludge having between about 13% and about 45% solids. The system is preferably an inline sealed continuous flow processing system. Conversion of the sludge assures the elimination of lumps by utilizing both blending and shearing inline mixers in series. The mixers include internal elements that create intense mixing and shearing to maximize chemical contact with all sludge particles, which thus allows complete reaction of an oxidizer such as sulfuric acid with the sludge, and substantially complete sterilization of pathogens.

The sludge conversion system is controlled so that the extract meets certain criteria, the parameters of which are monitored. First, the extract has a pH of less than 2 prior to transfer to the granulation process. The pH can be measured, for example, with inline probe and confirmed by laboratory grab samples. Second, the oxidation reduction potential (ORP) of the extract is greater than 300 mV. The ORP can be measured with inline probe and confirmed by laboratory grab samples. Third, the viscosity of the extract is less than 5,000 centipoise (cP). Viscosity may be measured with inline measuring devices and confirmed by laboratory grab samples. Fourth, the sulfuric acid exothermic reaction temperature during processing must reach at least 54° C. Temperature can be measured by inline probe and confirmed by laboratory grab samples.

The operational steps and equipment of the sludge conversion system will be described in further detail below. In brief, the system includes the following steps, in sequence. First, dewatered sludge is received from a transport system, such as dump trucks, dump trailers, or intermodal containers. The sludge has been dewatered to a solids concentrations ranging from about 13% to about 45% solids (averaging about 15% to about 17%). Next, the sludge is transferred into a live-bottom hopper, and is conveyed by a screw conveyor into the throat of a positive displacement piston pump. The sludge is pumped through at least one inline (blending) static mixer along with a first chemical oxidizer (sulfuric acid), and then through at least one inline (shearing) static mixer while adding water plus possible other conditioning chemicals (typically additional sulfuric acid, phosphoric acid, acetic acid, peracetic acid, hydrogen peroxide, liquid ferric sulfate, liquid zinc sulfate) if needed, and then through a pipeline into a mechanically mixed storage tank. The sludge is then aged in a continuously mixed storage tank to complete the conversion process and produce the carbon and amino acid extract. Stored homogenous extract can then be pumped to a day tank when needed to be supplied to a fertilizer granulation system.

In the embodiment of a sludge conversion system 100 shown in FIG. 1, the following equipment is arranged in sequence: a live bottom bin or hopper 10 for receiving dewatered sludge, one or more screw conveyors 14 for moving the dewatered sludge from the hopper 10, a positive displacement pump 20 for pumping the dewatered sludge, a first static mixer 30 for mixing acid (injected via valve 22) into the sludge, a second static mixer 40 for mixing conditioning chemicals and water (injected via valve 34) into the sludge, at least one extract aging tank 60, a transfer pump 70 for transferring extract from the aging tank 60 to a day tank 80, and a feed pump 90 for pumping extract from the day tank 80 to a fertilizer granulation system. A recirculating pump 62, allows extract to be transferred from tank to tank and recirculated within each tank.

Through the following description, an exemplary set of equipment is described, although it is understood that the sludge conversion system 100 and process may be scaled to a larger or smaller system as required. The sludge conversion system 100 is sized based on the desired granulated fertilizer output of a fertilizer granulation system 200 (as described below with reference to FIG. 2), since extract, the output of the sludge conversion system 100, is a primary ingredient input into the fertilizer granulation system 200 (shown in FIG. 2). For example, a fertilizer granulation system 200 producing 1,100 short tons per day ("stpd") (1000 metric tons per day) of granulated fertilizer would consume approximately 1,210 stpd of extract per day, based on a 1:1 process feed ratio (i.e., a fertilizer granulation system 200 that produces 1 dry ton of granulated fertilizer for every 1.1 wet tons of extract provided). This translates into about 1,030 stpd of delivered dewatered sludge at 15% solids (or 620 stpd at 25% solids), allowing for chemical additions during the conditioning process. Of course, if the design ratio changes (i.e., if the fertilizer granulation process makes more or less efficient use of the extract), the sizing of the sludge conversion system 100 must be adjusted accordingly.

When dewatered sludge arrives by dump truck or dump container, it is dumped into a live-bottom receiving hopper 10. The size and number of hoppers 10 can be selected to achieve a desired number of hours per day of operation and throughput capacity of the process. For example, to be able to handle two 20-25 ton dump trucks arrive simultaneously and emptying their loads in 15 minutes, as many as four pairs of hoppers 10 can be used, each hopper 10 having a capacity of 50 tons and being capable of emptying a 20 ton load in 25 minutes. A system of up to four pairs of hoppers could thus handle about 1030 tons per day of 15% dewatered sludge.

At this point, the dewatered sludge in the hoppers 10 contains about 13% to about 45% solids, and is thus odorous. The sludge also contains significant amounts of clumps and fibrous material, so that the viscosity is very high, typically on the order of 500,000 centipoise or higher, and could be as high as 2,000,000 centipoise.

In the hoppers 10, the sludge is mixed and moved to a series of out-loading shaftless screw conveyors 14 by way of multiple spiral screws or augers 12 internal to the bottom of the hopper 10. The hopper and screw conveyor motors are preferably variable speed to facilitate flow matching with downstream processing equipment. For example, the screw conveyors may be configured with two conveyors 14 serving each pair of hoppers 10 and being sized to transport up to a 20 ton load in 25 minutes.

The screw conveyors 14 transfer the dewatered sludge to the pump 20 which feeds the remainder of the conditioning system downstream to the aging tank 60. To be able to handle the viscous dewatered sludge, the pump 20 is preferably an open throat type positive displacement pump. Based on a 20 ton load transfer in 25 minutes, the pump 20 would be sized to pump at least about 200 gallons per minute. Multiple pumps can be arranged in parallel if necessary. The pump 20 is preferably driven by a hydraulic variable speed drive to accommodate desired variations in feed rate. Preferably the pump 20 is a piston pump.

The pumped sludge is preferably carried through the treatment process in piping that can withstand the same pressure conditions as the pump 20, namely highly acidic conditions (e.g., pH of less than 1) and high temperatures (e.g., above 50° C.). For example, the piping may be made from type 316 stainless steel. The flow rate of sludge will determine the size of the piping. For example, 200 gallons per minute of sludge feed would require approximately a 14 inch diameter pipe.

Next, a chemical oxidizer is injected into the dewatered sludge stream to initiate the process that neutralizes odor compounds by causing the ORP to increase above 300 mV, reduces viscosity, eliminates combustion, and homogenizes the material. The chemical oxidizer is added to the sludge just prior to the first static mixer 30.

Preferably, the chemical oxidizer is an acid at a feed rate of about 1% to about 50% by weight of the waste materials, preferably 10% by weight. For example, an acid feed rate of 20 gpm can correspond to a pumped sludge rate of 200 gpm. Preferably, the acid is sulfuric acid at a grade of 93% or higher. More preferably, the acid is sulfuric acid at a grade of about 98%. Most preferably, a combination of sulfuric acid and phosphoric acid are added in quantities of about 10% by weight sulfuric acid and about 2% by weight phosphoric acid. The acid can be added to the sludge using pumping. Preferably, the acid is added by chemical metering pumps that can apply pressures of up to 200 psi. The initial pH of the sludge, typically in the range of about 5 to about 6, is reduced by the acid addition to a pH of about 1 to about 2. The acid aids in oxidizing, hydrolyzing, fluidizing, and sterilizing the organic waste material in the sludge. In addition to the acid; water can be added to the sludge at concentration of about 1% to about 50% by weight, preferably about 7.5% by weight, to help fluidize the sludge.

The temperature of the sludge is monitored by a temperature sensor 32 located at or near the downstream end of the first static mixer 30. Preferably, the sludge will reach a temperature of at least about 54° C. by the time it exits the first static mixer 30, in order to ensure that many of the biologically active components of the sludge are neutralized. Any commercially available static mixer can be used.

The pumped sludge, mixed with the chemical oxidizer, continues downstream into the first static mixer 30. The first static mixer 30 is a static blending mixer designed to disperse the chemical oxidizer in the sludge. The combination of mechanical blending and the chemical reaction of the chemical oxidizer with the organic waste material in the sludge reduces the viscosity from as high as 2,000,000 centipoise to less than about 5,000 centipoise. In one embodiment, the first static mixer 30 is configured to achieve mixing in two ways, by flow diversion and recombination and by radial mixing.

After the blended and lower viscosity sludge exits the first static mixer, the sludge flows into the second static mixer 40. Any commercially available static mixer can be used. Just upstream of the second static mixer 40, additional water and, if required, additional conditioning chemicals are injected. The additional conditioning chemicals may include, but are not limited to, sulfuric acid, phosphoric acid, acetic acid, peracetic acid, hydrogen peroxide, ferric sulfate, ferrous sulfate, iron ore, aluminum sulfate, zinc sulfate, ground phosphate rock, boron, molybdenum, and combinations thereof. Ferric sulfate provides iron as a micronutrient to the fertilizer and increases the hardness of the fertilizer accreted granules. Phosphoric acid, if added, is preferably added in small amounts (i.e., about 0.1% to about 20% by weight) at a grade of about 30% to about 70%, preferably about 40% to about 60%, and more preferably, at about 54%. The phosphoric acid adds hardness to the acidified waste material and improves the granulation ability of the resulting granulator melt extract.

When water is added, the total amount added is preferably from about 1% by weight to about 25% by weight. The amount of water that is added is dependent on the solids concentration of the starting dewatered sludge materials that are used. The total amount of water in the extract ultimately includes any water included in the original dewatered sludge, water from the ferric sulfate/water mixture, water from the sulfuric and phosphoric acids, and water from any other source.

The second static mixer 40 incorporates the conditioning chemicals into the sludge and further homogenizes the sludge. The second static mixer 40 is an inline shearing static mixer intended to create excellent mixing and break up any remaining clumps of material in the sludge. The second static mixer may have slightly cupped shearing strips that are nested together to form an element. At the exit of the second static mixer 40, the sludge is essentially a conditioned, homogeneous extract of carbon and amino acids that can be used as a feedstock for a downstream granulation process. At the downstream end of the second static mixer 40, various sensors are located to measure the process conditions of the extract. In particular, a temperature sensor 42, a pH sensor 44, an oxidation reduction potential (ORP) sensor 46, and a viscosity meter 48 are provided in the piping downstream of the second static mixer 40. A flow meter 50 is also provided to measure the flow rate of sludge. A preferred temperature range at this point in the process is from about 20° C. to about 70° C. A preferred pressure range in the system is from about 30 psig to about 300 psig, and more preferably from about 90 psi to about 110 psi. If necessary, the amount and concentration of acid and other conditioning chemicals added in the upstream process steps may be adjusted to achieve a desired temperature, pressure, pH, ORP, pathogen count, viscosity, and so on.

After the second static mixer 40, the sludge (now an extract of carbon and amino acids) flows into one or more storage and mixing tanks 60. The number and size of the tanks 60 is determined by the throughput of the conditioning system 100 and the desired residence time in the tanks 60. The residence time in the storage tank or tanks 60 can be from about 12 hours to about 96 hours. Preferably, the residence time is from about 2 days to about 4 days. For example, for a 1,100 stpd conditioning system 100, three tanks 60 can be used, each tank 60 providing a storage capacity of 440,000 gallons each.

Each tank 60 is preferably coated with a material that allows the tank to withstand highly acidic conditions (e.g., pH 0.5-2.0) and elevated temperatures (e.g., above 50° C.). Each tank 60 is equipped with a mechanical vertical mixer 64 that agitates the extract to maintain homogeneity and enables the extract to "age" as the chemical reaction process is completed. For example, a commercially available low-speed agitator can be provided in each tank 60 to maintain the consistency of the extract. Each agitator 64 is preferably fitted with two impellers, both the same size, and a tickler impeller at the bottom of each shaft. At the completion of the residence time, the extract is typically in a colloid-like state.

A recirculation pump 62 may also be provided to further agitate and homogenize the contents of the one or more tanks 60.

The extract is transferred from the storage tanks 60, first typically to a day tank 80 and then to a fertilizer granulation system 200. Preferably, the extract is transferred using a transfer pump 70. The pump 70 is sized according to the desired flow from the tanks 60. Preferably each storage tank 60 will have its own dedicated pump. For example, to empty a 440,000 gallon tank in approximately 8 hours, a 200 gpm pump may be used. Suitable pumps include positive displacement rotary lobe pumps 70.

Typically, the extract is pumped to a day tank 80 that holds a limited volume to be used imminently in a downstream fertilizer granulation system 200. The day tank 80 provides for additional mixing preferably at a higher mixing rate than in the storage tanks 60. The day tank 80 allows for final standardization of the extract prior to be converted to a fertilizer. One or more day tanks 80 may be used in parallel or series. The day tank or tanks 80 are preferably be sized for a minimum of 25% of the daily requirement for extract. For example, the day tank 80 may be from 80,000 to 150,000 gallons in capacity.

From the day tank 80, the extract is pumped to the fertilizer granulation system 200 by a feed pump 90. Preferably, the feed pump 90 is a positive displacement rotary lobe pump. The feed pump rate is sized to match the capacity and desired flow rate of the fertilizer granulation system 20, and specifically to match the extract consumption rate in a pipe-cross reactor in the fertilizer granulator system. For example, for a 1,100 stpd fertilizer system, a pump having a capacity of 150 to 200 gpm can be used.

In addition to the inline measurements discussed above, a number of parameters can be measured inline at one or more other locations, in one or more of the storage tanks 60, and/or in the day tank 80. The measurements can include viscosity, temperature, ORP, and pH. Other measurements, such as particle size analysis, are also contemplated. The measurements can be measured manually or can be automated.

Such measurements can be used to adjust the treatment process to optimize the extract. The optimization can be done manually or can be automated. Optimization can include adding or removing heat to the system, adjusting the amount of one or more of the chemical additives, modifying the exothermic reaction, adjusting the mixing speed of one or more of the mixers, and adjusting the flow to bypass or pass through one or more of the inline devices.

In summary the process shown in FIG. 1, accepts organic waste material-containing sludge in various forms, including dewatered sludge, and coverts that sludge to an extract that is essentially pathogen and odor free, of sufficiently low viscosity to be readily pumpable, and suitable as a feedstock to a pipe reactor fertilizer granulation system. The extract preferably has an ORP of greater than 300 mV, a pH of about 1.0 to about 2.0, a viscosity of less than 5000 cps (preferably less than 3000 cps, and more preferably less than 1000 cps), and is substantially free of pathogens and sulfur compounds.

The extract produced by the processes illustrated in FIG. 1 and described above has numerous beneficial characteristics.

First, the extract is essentially homogenous, and is flowable as measured by fluid viscosity. Historical treatment processes, especially those utilizing chemical dewatering polymers, produced a material that had a viscosity in excess of 1,000,000 centipoises, which made it difficult, if not impossible, to mix the material and/or store the material in large storage tanks (e.g., storage tanks over 200,000 gallons). In contrast, the present processes produces extract having a viscosity significantly less than about 5000 centipoises, typically below 3000 cemipoises, and more typically as low as 1000 centipoises. The extract also has a pH of about 0.5 to about 2.0, and more typically from about 1.5 to about 2.0, so that less acid need be added in the fertilizer granulation process.

Additionally, the extract has an oxidation reduction potential ("ORP") of greater than about 250, and typically greater than about 300, and more typically greater than about 350. ORP measurements can be relied on to determine disinfection potential of the material being measured. Low ORP values, such as those found in materials generated in historical treatment processes (e.g., ORP of less than 1 demonstrate that the microbial kill or disinfection potential in those materials is low. In contrast, a higher ORP, such as in the extract, indicates a high disinfection potential of the material. Increasing the ORP reduces odors and reduces the potential of fires from combustible material in the final product.

The extract is substantially odorless as a consequence of eliminating odor causing compounds through oxidation of compounds such as carbon sulfide, carbonyl sulfide, dimethyl disulfide, dimethyl sulfide, ethyl mercaptan, hydrogen sulfide, isopropyl mercaptan, methyl mercaptan, sulfur dioxide, and other odor causing sulfur-producing compounds. Odorless or substantially odorless processes and products provide a significant advantage in finding a site for a sludge processing facility.

Further, the extract is substantially free of pathogens. Pathogens include pathogenic bacteria, parasites, Helminth eggs, and viruses. Generally, the treatment processes described above substantially eliminate pathogens due to the stresses created by low pH conditions and high temperatures, which sterilizes the sludge. As a result, pathogen regrowth is prevented, not only in the extract but in any products (e.g., fertilizers) produced therefrom.

The extract produced by the system and process described herein can be processed downstream into a fertilizer using any known fertilizer processing method. For example, the material can be processed according to the processes in U.S. Pat. Nos. 7,128,880; 7,169,204; 6,159,263; 5,984,992; 6,758,879; 6,841,515; and 8,057,569.

FIG. 2 shows an overview of a fertilizer granulation system 200 and process starting with the extract as a feedstock. The system 200 for processing the homogeneous extract into a granular fertilizer includes at least a pipe reactor 210, a granulator 220, and a dryer 230. The system 200 may also include a cyclone and Venturi scrubbers 232 to capture dust exhausted from the dryer 230 and screens 240 to refine the size of the fertilizer accreted granules. Undersized accreted granules can be returned to the granulator 220 as fines, and oversized accreted granules can be crushed in a crusher 242 and similarly returned to the granulator 220 as fines. A cooler 250 may also be included to cool the fertilizer accreted granules downstream of the dryer 230, and scrubbers 260 may be necessary for pollution control. The reactor 210 can be a pipe reactor. Preferably, a pipe-cross reactor is used. The granulator 220 can be a rotary drum granulator. The dryer 230 can be any dryer used in the industry.

In brief, in the embodiment of a fertilizer granulation system depicted in FIG. 2, the extract is pumped into a pipe-cross reactor (PCR) 210 where it absorbs heat generated by the reaction between concentrated sulfuric acid and anhydrous ammonia that are injected into the PCR 210. Temperatures of up to 100° C. and a pH of 2 or lower are generated in the PCR 210. At these operating conditions inorganic salts are formed from the reaction of mixing acid with anhydrous ammonia, microbial sterility is achieved, hydrolysis of the organic macro-molecules (proteins) that are present in the wastewater residuals occurs, proteins are converted to amino acids and bind with the inorganic salts created to form complexes that resist volatilization and leaching of the fertilizer product, A reaction melt is thus produced from the extract, and the melt is transferred to the granulator 220, which removes about 50% to 65% of the water as a result of the exothermic energy generated by the acid-base reaction. Specifically, greater than 50% of the water is flashed off from the melt as steam, and the melt is then rolled onto recycled fine particles in a granulator 220 to form accreted granules. Therefore, only about 50% additional combustion energy is required in the dryer 230 to complete the drying process. This process results in a hard fertilizer accreted granule containing less than 2% moisture.

When the extract is processed into a fertilizer using a traditional fertilizer manufacturing processes or any other similar processes, such as the process shown in FIG. 2, the resulting fertilizer generally has physical characteristics that meet or exceed industry standards. The resultant fertilizer is a slow-release granulated fertilizer high in nitrogen, sulfur, and micronutrients and containing essential plant growth amino acids. The fertilizer can also include phosphorous, typically in the form of phosphates. A preferred Nitrogen-Phosphorous-Sulfur formulation is 17-1-0-19. Other formulations with greater or lesser amounts of nitrogen, greater amounts of phosphorous, greater amounts of potassium, and/or greater or lesser amounts of sulfur are also contemplated.

A typical composition of fertilizer accreted granules produced by the processes described herein is listed in Table 1.

TABLE 1

| Component | Weight Percentage |
|---|---|
| Organic matter (including carbon compounds and amino acids) | 0.5-4.0 |
| Nitrogen (all forms) | 13-20 |
| Phosphorous ($P_2O_5$) | 1-13 |
| Potassium ($K_2O$) | 0 |
| Sulfur | 14-24 |
| Iron | 0.5-3 |
| Zinc | 0.5-2 |

The physical properties of fertilizer accreted granules produced by the processes described herein are significantly improved over other types of fertilizers, as shown in Table 2. In particular, note that the present fertilizer accreted granules have a critical relative humidity significantly higher than that of other fertilizers, and a moisture absorption and penetration that are generally lower, as well as no tendency to cake. As a result, the present fertilizer accreted granules can be stored even in a relatively humid environment for a period of time without degradation or caking together. Additionally, the high ORP of the present fertilizer accreted granules means that the accreted granules are essentially free of odor, and the non-existent combustion potential of the accreted granules means that they are not self-heating and will not combust when airborne as dust or when stored in a pile, which makes the present fertilizer accreted granules exceptionally safety to store and transport.

TABLE 2

| Property | Present Fertilizer Accreted granules | Granular Urea | Granular MAP | Granular DAP |
|---|---|---|---|---|
| Critical Relative Humidity (%) | 80-85 | 70-75 | 70-75 | 65-75 |
| Moisture Absorption (mg/cm$^2$) | 41-144 | 350 | 90 | 175 |
| Moisture Penetration (cm) | 0.5-1.0 | 15 | 1.0 | 2.0 |
| Accreted granule Crushing Strength (kg) | 2.0-2.6 | 1.5-3.5 | 2.0-3.0 | 3.0-5.0 |
| Accreted granule Integrity (wet) | Excellent | Fair-Good | Fair-Good | Fair-Good |
| Bulk Density (kg/m$^3$) | 825-875 | 720-820 | 900-1100 | 875-1100 |
| Combustion Potential | None | None | — | — |
| ORP (mV) | +350 | — | — | — |
| Abrasion Resistance (% degradation) | 0.86 | 1.3 | — | — |
| Caking Tendency | None | — | — | — |
| Angle of Repose (°) | 35.4 | 33 | 34-48 | 27-28 |
| pH | 5.9-6.5 | — | — | — |
| Flowability | 175-280 | 5-17 | — | — |

The fertilizer accreted granules produce by the system and processes disclosed herein are typically substantially uniform in composition, meaning that each accreted granule of fertilizer has essentially the same quantity and quality of nitrogen, phosphorous, and other materials as all other accreted granules. In addition, a granule produced from a particular source will have nearly identical, if not identical, compositions as all other accreted granules produced from the same source and processed in the same manner as the first accreted granule.

A substantially uniform composition allows for normalized application rates of the fertilizer. Currently, commercial fertilizers are a mixed blend of various ingredients N, P, K and numerous micronutrients. These mixtures have a segregation of nutrients and are generally not uniform in composition. Consequently, to get the desired amount of each ingredient across an entire field, extra fertilizer must be applied, or the fertilizer must be applied in irregular patterns. The substantially uniform composition of the fertilizers produced from the extract overcomes these problems.

The resultant granular fertilizer is free of pathogens, and has been shown to have deactivated emerging compounds of concern such as endocrine disruptors, pharmaceuticals, and antimicrobials. The resultant granular fertilizer is substantially free of sulfur producing compounds comprising sulfides, disulfides, and mercaptans.

Production of Fertilizer Samples for Testing.

Fertilizer samples have been produced for purposes of testing the properties of the fertilizer. Dewatered sewage sludge from a domestic (U.S.) activated sludge wastewater treatment plant was obtained. The wastewater treatment plant process included waste sludge dewatering with a belt filter press. The sludge contained 15-16% solids by weight, had a viscosity greater than 1,000,000 cps, an ORP of less than 1, and a pH of 5.

The dewatered sludge was placed into a bin and was then pumped out of the bin using a progressive cavity pump at a rate of 5 gallons per minute. The sludge was pumped through an inline static mixer at 4-inch diameter. Added inline were 10% by weight 93% sulfuric acid and 7.5% by weight water to form an acidified sludge. The acidified sludge was then passed through a (i.e., an inline static mixer). From the second mixer, the acidified sludge was passed into a first storage tank. The acidified sludge was mixed in the first mix tank with a vertical mixer to create a substantially homogenous fluid sludge mixture. The substantially homogenous sludge was then passed into a second storage tank. The sludge was agitated in the second tank with a second vertical mixer. The agitation in the two tanks created an extract having an ORP of greater than 300, a pH of 1.5, and viscosity of less than 2000 centipoise.

The extract was pumped into a pipe-cross reactor at a rate of 280 kg/hr. In the pipe-cross reactor, 93% sulfuric acid and anhydrous ammonia were added to the extract at rates of 140 kg/hr of 93% sulfuric acid and 49 kg/hr anhydrous ammonia, to form a fertilizer melt. The fertilizer melt passed through a first part of the pipe-cross reactor in 3.8 seconds at 98° C. The fertilizer melt passed through a second part of the pipe-cross reactor in 4.2 seconds at 128° C. After the pipe-cross reactor, the reacted material was passed to a granulator to form accreted granules. Ammonia at a rate of 27 kg/hr was added to the fertilizer melt in the granulator. Liquid alum at a rate of 6.5 kg/hr was added to the fertilizer melt in the granulator. Between 27% and 30% iron sulfate was added to the fertilizer melt in the granulator. The accreted granules were then dried in a dryer, which operated at 7 revolutions per minute. The material was passed to an inclined double deck mechanically vibrated system with an undersize screen having a 2.36 mm opening. Anything between 2.36 mm and 4 mm went to storage. All under and oversized material were returned to the granulator where it was mixed with the melt again. A physical and chemical analysis of the dried accreted granules between 2.36 mm and 4 mm was then performed.

Product Stability and Odor.

Odor problems with organic fertilizers are commonly created by putrefaction of organic material which results in the generation of odorous substances such as mercaptans, hydrogen sulfide, and tertiary alkyl amines. The odor producing sulfate-reducing bacteria of the putrefaction process generate odors when their oxidation reduction potential (ORP) drops below −200 mV. Testing has demonstrated that fertilizers produced using extract as described herein are homogenized, hydrolyzed, and sterilized, and have an ORP of 350 mV. At this ORP value there is no concern regarding putrefaction of the resulting granular fertilizer. There are no odor producing compounds, and the fertilizer is thermally stable, meaning that it will not undergo a heating event or produce odors. The fertilizer has a solids content of 98%, which exceeds the US EPA 503 rule requiring a minimum solids content of 90% to be classified as stable.

Combustibility.

Dust-cloud combustibility of the granular fertilizer as produced by the processes described herein was determined by a combustion research lab (Kidde-Fenwal Combustion Center, Ashland, Mass.). The classification of a dust as combustible or not combustible depends on whether the dispersed dust cloud is capable of sustaining a deflagration sufficient to cause a rise in pressure of 1 bar (14.5 psi). Tests are carried out in a Kuhner 20-1, spherical test vessel. Dusts that are not combustible at an initial concentration of 500 g/m$^3$ are retested at 1000 g/m$^3$ and 2,000 g/m$^3$. The material is classified as combustible if the explosion pressure, corrected for the effects of the igniter, is greater than 1.0 bar (14.5 psi). Where the observed explosion pressure rise is less than 1 bar at all test concentrations the dust is classified as not combustible.

The granulated fertilizer dust from the granular fertilizer produced by the processes described herein was classified as noncombustible at concentrations of 500, 1,000 and 2000 g/m$^3$. The fertilizer is essentially noncombustible in a dust cloud combustibility test conducted in accordance with ASTM Standard Test Method E1226. In contrast, three samples of pelletized dried sludge were classified as combustible at dust concentrations of 500 g/m$^3$. In addition, tests subjecting the fertilizer samples to temperatures of 140° C. showed that the fertilizer does not spontaneously ignite or "self-heat" (i.e., it does not rise 60° C. above the oven temperature in 24 hours).

Heavy Metals.

The process described herein controls the metals content in the resultant granular fertilizer because any heavy metals present in the initial dewatered sludge are diluted by the addition of acid, base, and conditioning chemicals (e.g., 140 dry metric tons of dry wastewater sludge solids are mixed with approximately 800 dry tons of ammonium sulfate to produce 1,000 dry metric tons of granular fertilizer). Thus, there is a seven-fold reduction of the concentration of metals in the granular fertilizer when compared to the metals observed in the original domestic wastewater residuals. As can be seen in Table 3, the metals content of the granular fertilizer is below the criteria for the United States Federal Soils Screening Test (SST) for residential (non-contaminated) soils, which are an order of magnitude more stringent than the EPA 503 guidelines. Additionally, the granular fertilizer pass the Association of American Plant Control Officials (AAPFCO) for food criteria, and can meet even with adjustment of the blend of wastewater residuals dry solids content to the ammonium sulfate content, the resulting granular fertilizer can even meet the most stringent criteria in Europe and throughout the world.

TABLE 3

| Metal | Present Fertilizer Accreted granules | AAPFCO | AAPFCO | SST (US) | EPA Part 503 | Germany | Spain | UK | Denmark |
|---|---|---|---|---|---|---|---|---|---|
| As | 3.29 | 13 | 78 | 12 | 41 | | | | |
| Cd | 1.6 | 10 | 60 | 3.4 | 39 | 1.5 | 1 | 3 | 0.5 |
| Cr | 8.82 | | | 23 | 1200 | 100 | 100 | 400 | 30 |
| Cu | 46.5 | | | 310 | 1500 | 60 | 50 | 135 | 40 |
| Pb | 7.42 | 61 | 366 | 100 | 300 | 100 | 50 | 300 | 40 |
| Hg | 0.14 | 1 | 6 | 2.3 | 17 | 1 | 1 | 1 | 0.5 |
| Mo | 2.51 | 42 | 252 | | | | | | |
| Ni | 10.0 | 250 | 1500 | 16 | 420 | 50 | 30 | 75 | 15 |
| Se | 1.62 | 26 | 156 | 20 | 36 | | | | |
| Zn | 107 | 420 | 2520 | 2300 | 2800 | 200 | 150 | 200 | 100 |

Incubation.

Figure 3A:
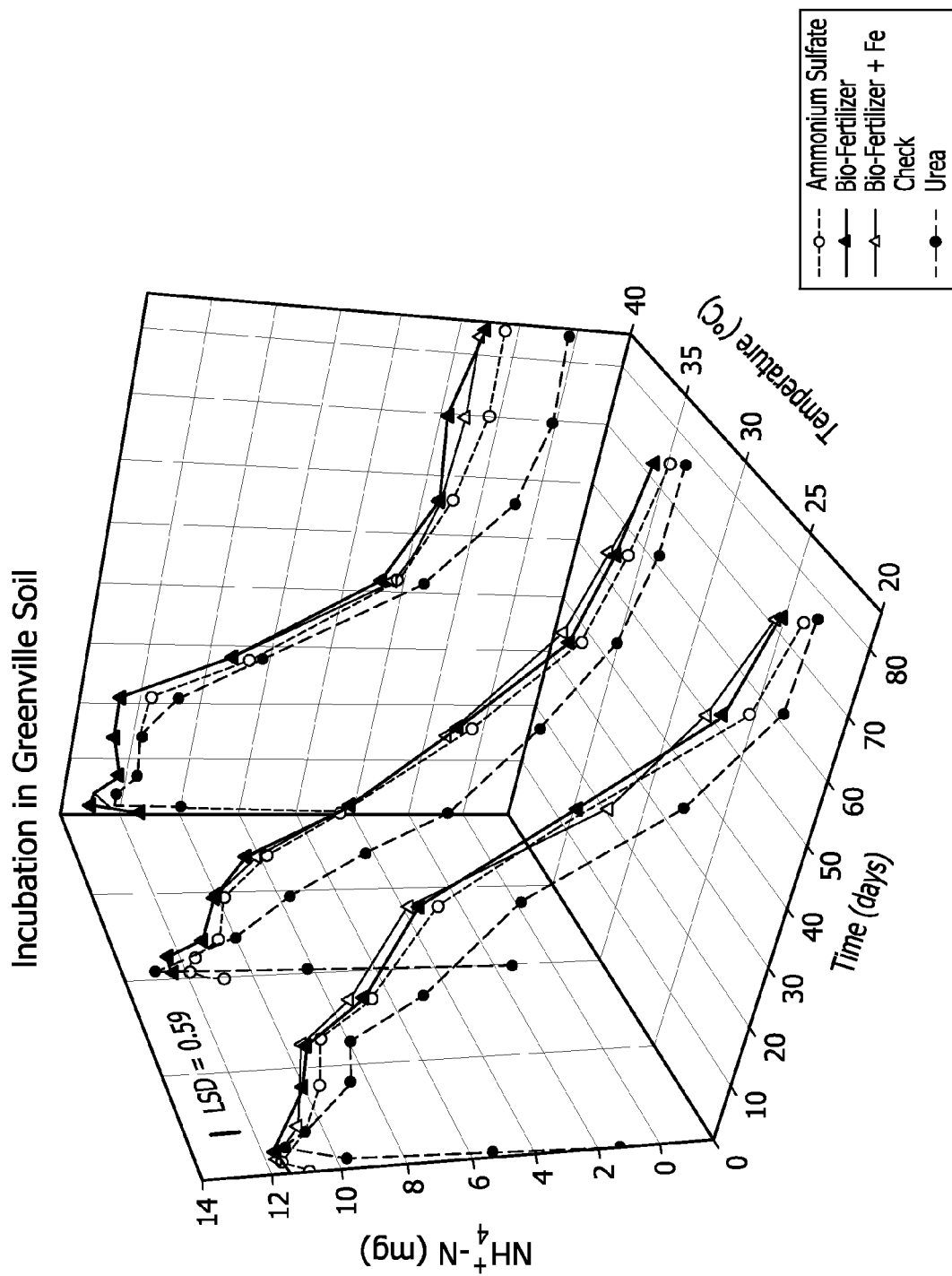
FIGS. 3A and 3B are graphs of data for incubation of an organically enhanced nitrogen-phosphorous-sulfur fertilizer product as described herein as compared with alternative fertilizers.
Figure 3B:
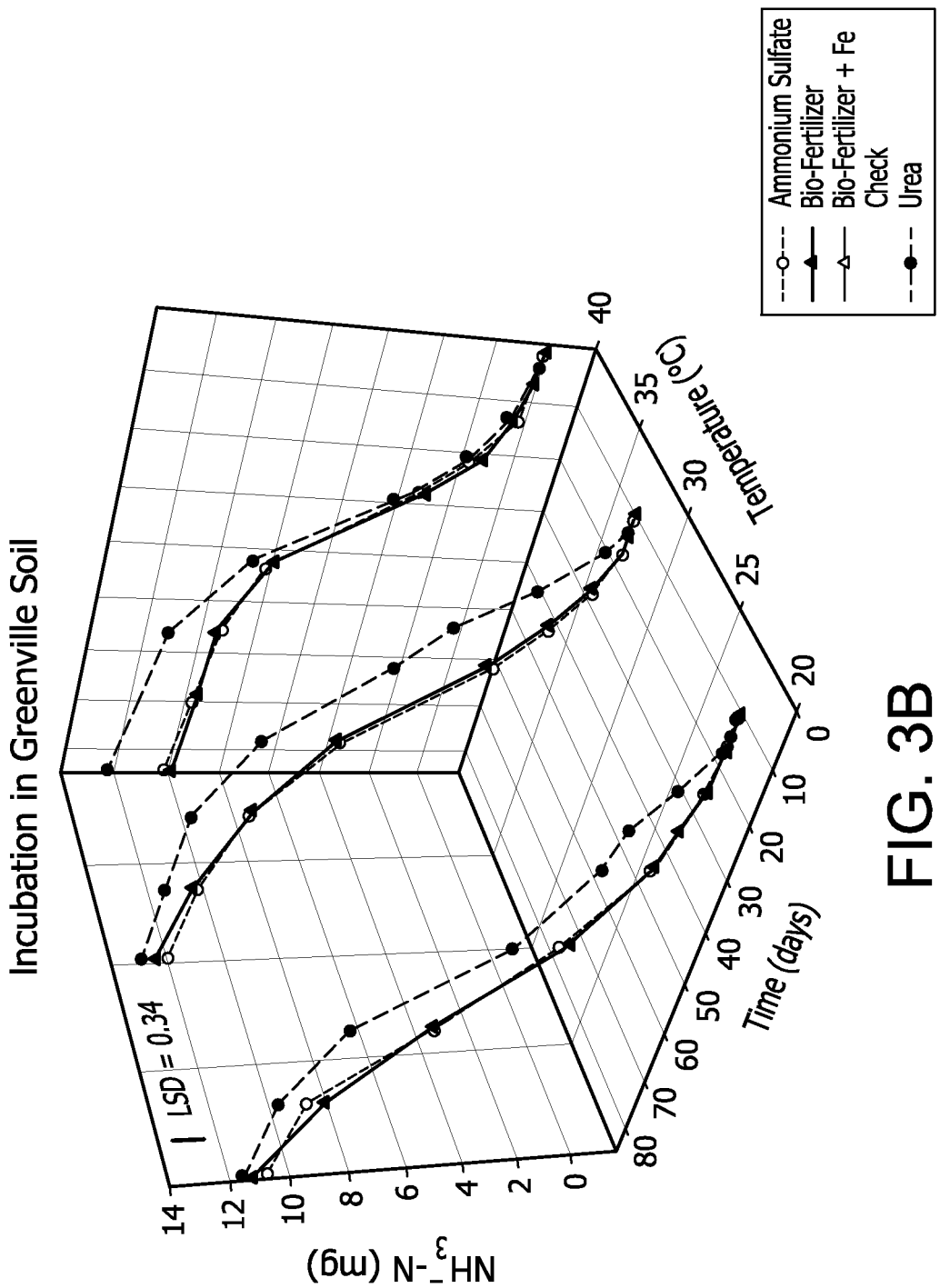

Field incubation testing was conducted in Greenville soil, and the results are shown in FIGS. 3A and 3B. As shown in FIG. 3A, fertilizers produced by the processes described herein ("bio-fertilizer" and "bio-fertilizer+Fe") show a very similar rate of conversion of ammonia to nitrate as a benchmark fertilizer and ammonium sulfate, and only a slightly slower conversion than urea.

Volatilization.

Some current fertilizers use urea as a nitrogen source. These urea-based fertilizers have significant problems with leaching and volatilization. Urea leaches up to 30% of its nitrogen through the root zone and volatizes up to 30% of its nitrogen through the root zone. As a result, the nitrogen is unavailable to the plant roots must be compensated for by adding more fertilizer, which can be costly, and contaminates the environment. The fertilizers produced from the homogeneous extract described herein overcome these problems by relying on recycled organic waste materials without the need to supplement the fertilizer with urea.

Figure 4A:
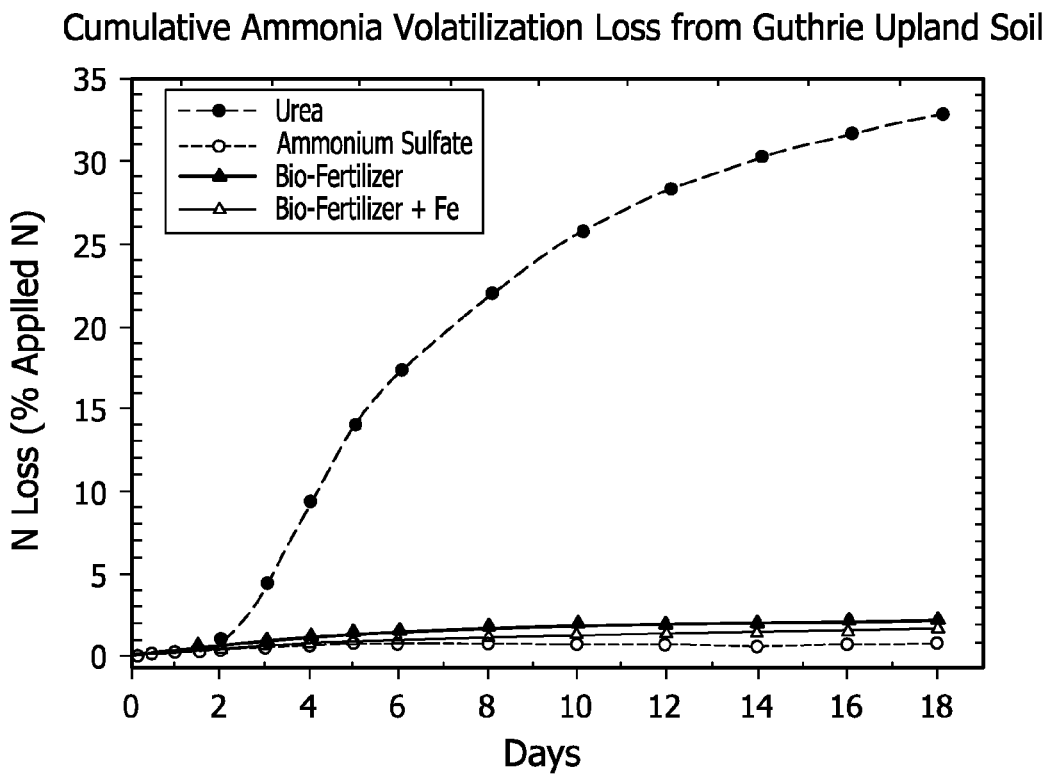
FIGS. 4A, 4B, 4C, and 4D are graphs of data for volatilization losses of an organically enhanced nitrogen-phosphorous-sulfur fertilizer product as described herein as compared with alternative fertilizers in various types of soils.

Field volatilization testing was conducted in Guthrie and Sumter solids, in both upland and flooded conditions, and the results are shown in FIGS. 4A through 4D. FIG. 4A shows that the cumulative ammonia volatilization loss in Guthrie upland soil for fertilizers produced by the processes described herein ("bio-fertilizer" and "bio-fertilizer+Fe") were nearly identical to those of ammonium sulfate, and significantly less than those of urea. Specifically, ammonia volatilization losses from urea were up to 33%, whereas volatilization losses from the present fertilizers were only about 2%. This result may provide a significant carbon sequestering benefit when using the present fertilizers, and may even make available a carbon credit opportunity.

Figure 4B:
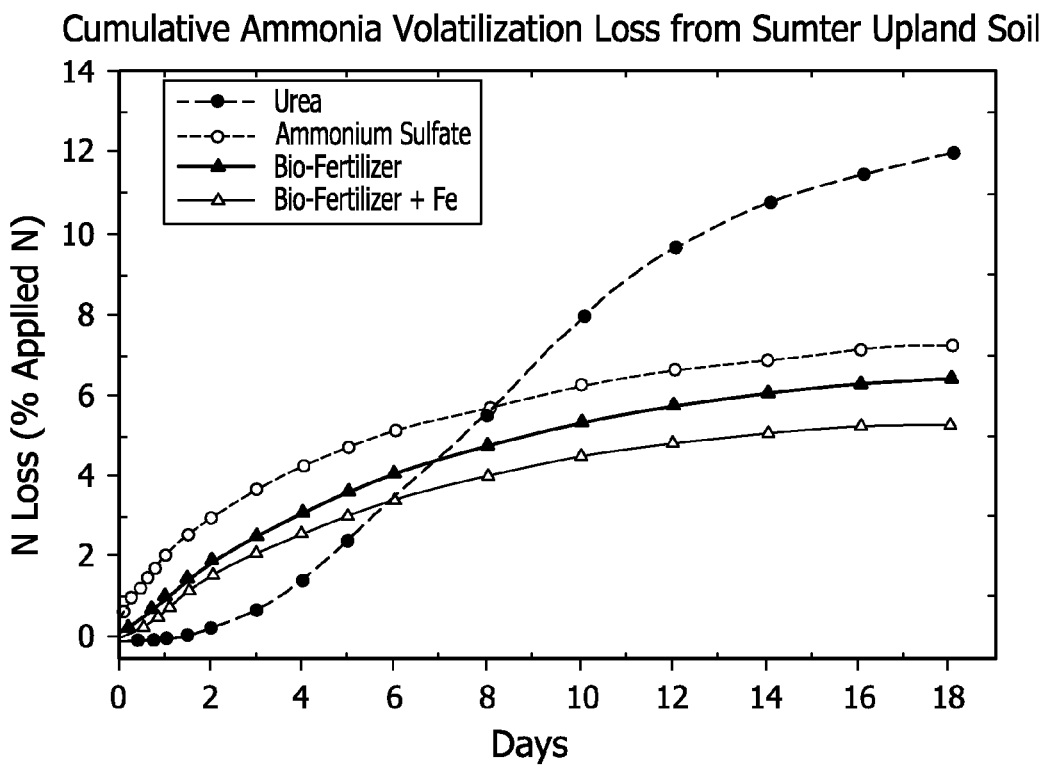
Figure 4C:
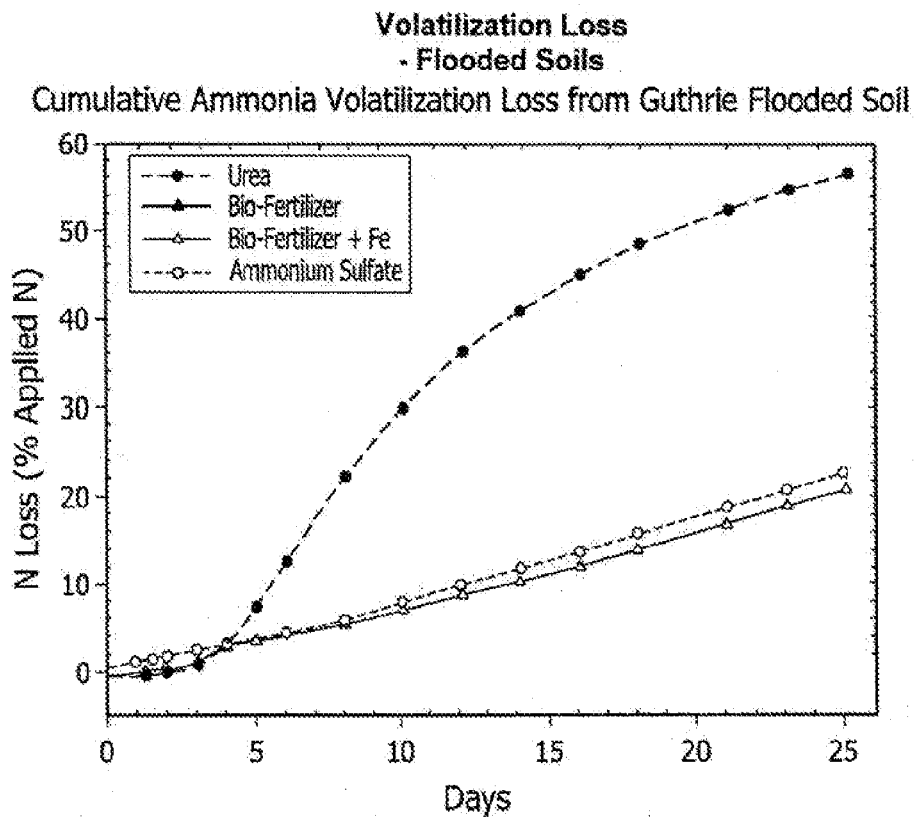
Figure 4D:
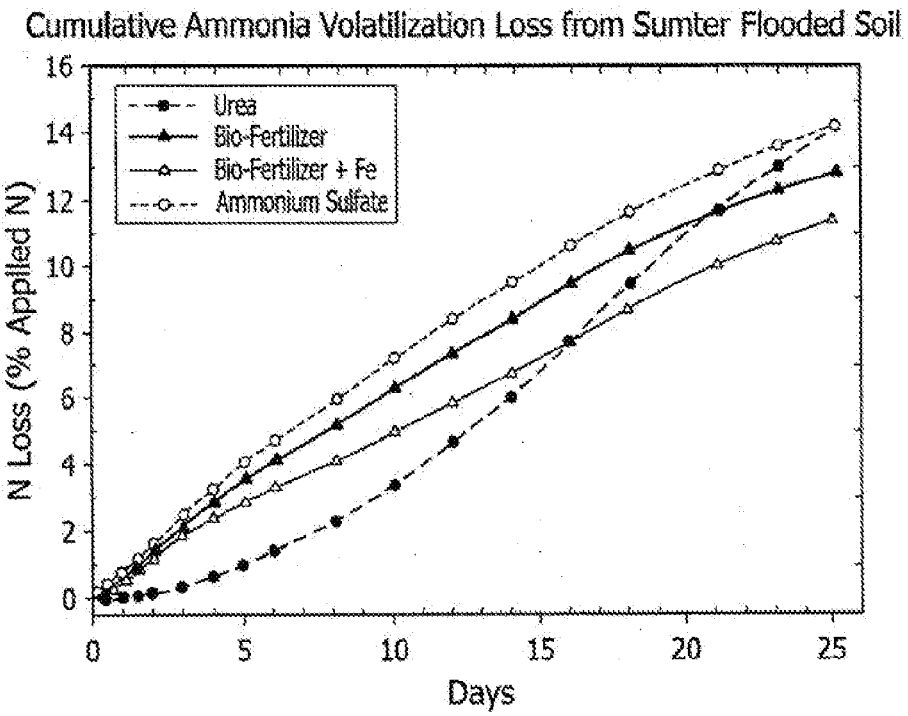

FIG. 4C shows, qualitatively, a nearly identical result for Guthrie flooded soil. FIG. 4B shows a similar result for Sumter upland soil with the present fertilizers even outperforming ammonium sulfate. FIG. 4D shows that in Sumter flooded solids, the present fertilizer performed nearly as well as urea, and somewhat better than ammonium sulfate.

Leaching.

Figure 5A:
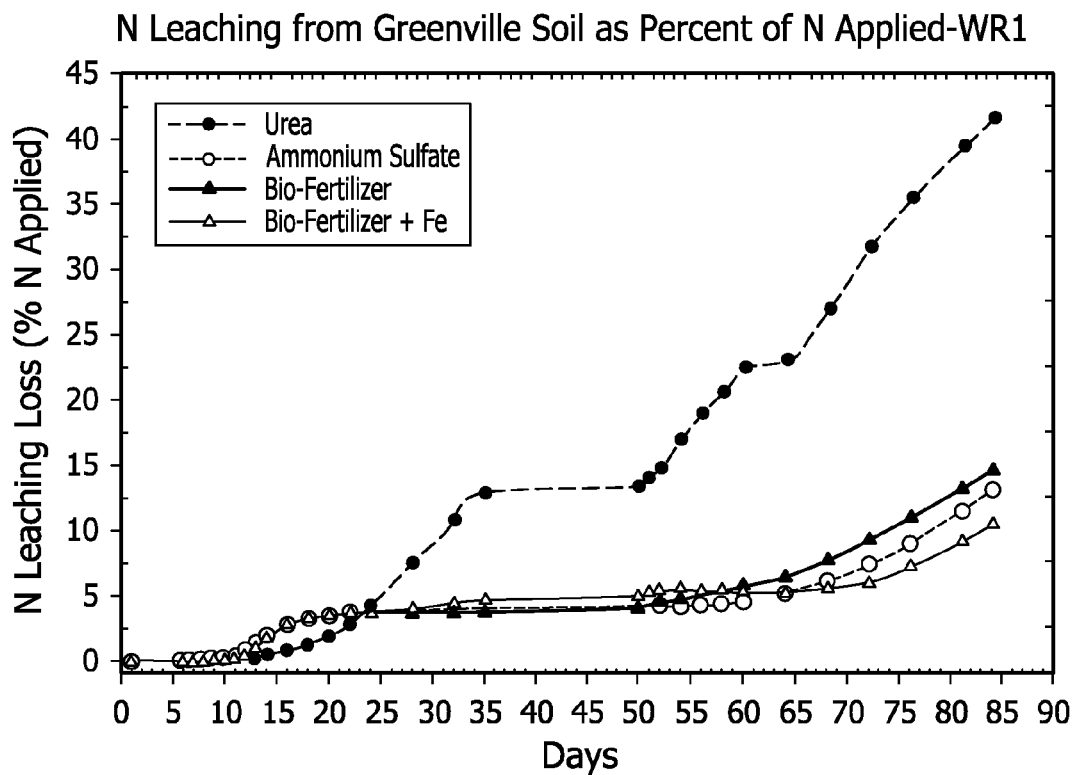
FIGS. 5A and 5B are graphs of data for leaching losses of an organically enhanced nitrogen-phosphorous-sulfur fertilizer product as described herein as compared with alternative fertilizers in differently types of solids.
Figure 5B:
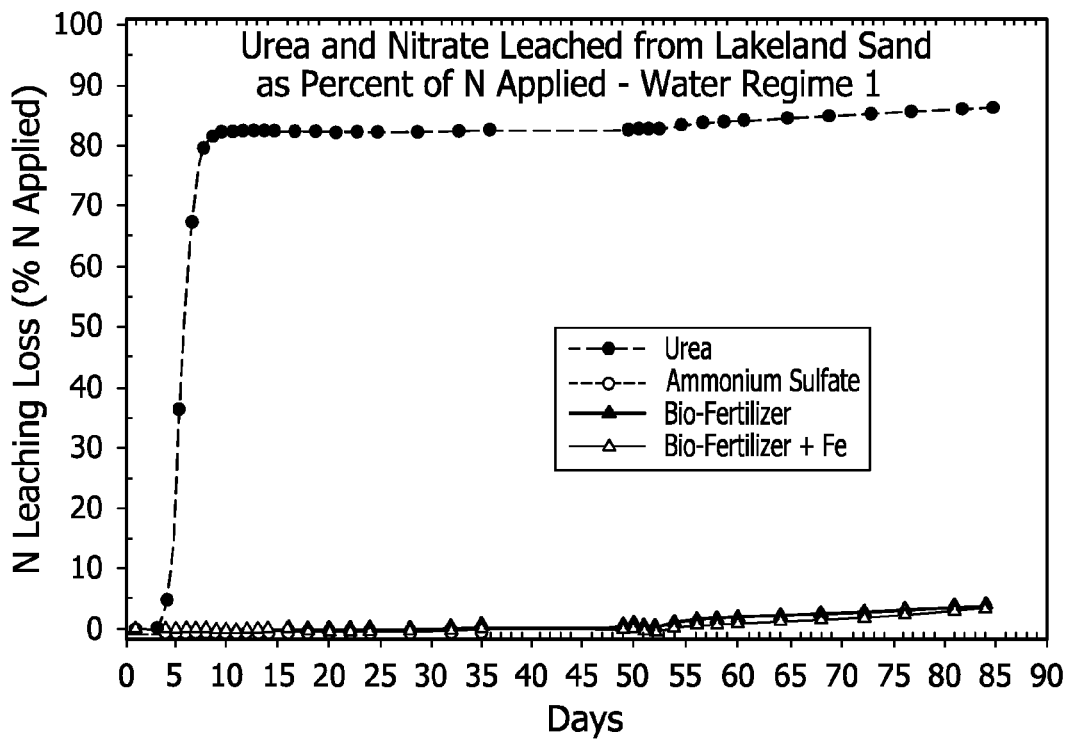

Field leaching testing was conducted in Greenville soil and Lakeland sand, and the results are shown in FIGS. 5A and 5B. In Greenville soil, as shown in FIG. 5A, the present fertilizers exhibited low leaching losses, comparable to those of ammonium sulfate and far lower than those of urea. In Lakeland sand, the results were even more dramatic, as the present fertilizers exhibited almost no leaching losses (comparable to ammonium sulfate), far less than was observed with urea.

In sum, between leaching and volatilization, the difference in nitrogen loss between the granular fertilizer described herein and urea is dramatic. For example, in upland Guthrie/Greenville soils, urea lost 33% of its nitrogen to volatilization and 41% to leaching, for a total loss of 74%. By comparison, the present granular fertilizer lost only 2% of their nitrogen to volatilization and 13% to leaching, for a total loss of 15%. Thus, 3.5 times more nitrogen is available from the present granular fertilizer as compared with urea, so that 3.5 times less fertilizer can be used to achieve the same nitrogen delivery to crops.

Similarly, in flooded Guthrie/Greenville soils, urea lost 57% of its nitrogen to volatilization and 19% to leaching, for a total loss of 76%. By comparison, the present granular fertilizer lost only 21% of their nitrogen to volatilization and 15% to leaching, for a total loss of 36%. Thus, 2.7 times more nitrogen is available from the present granular fertilizer as compared with urea.

For upland Lakeland sand, urea lost 86% of its nitrogen, essentially all to leaching, while the present granular fertilizer lost only 4% of their nitrogen. Thus, nearly 7 times more nitrogen is available from the present granular fertilizer as compared with urea.

Crop Productivity.

The fertilizer can be land applied for grain, forage crops, turf grass, vegetables, citrus, fruit trees, silva culture, row crops, nuts, horticulture, ornamentals, greenhouse crops, oil (e.g., soybean, canola) and so on without continuous monitoring and reporting requirements to federal or state agencies. The fertilizer can be land applied directly or blended with other fertilizers.

When applied to crop fields, the crop quality is increased as compared to historical fertilizers. For example, greater amounts of sugar are present in citrus crops, greater amounts of protein are present in forage products, and greater amounts of starch in corn when the fertilizer made from the processes described herein are used in lieu of other fertilizers. In addition to increased quality, crop fields that have fertilizers made according to one of the processes described above applied to them, yield a larger quantity of crops per unit area. The improved quality and quantity of the crops can be attributable to at least the substantially uniform nature of fertilizer allowing for even application, limited nitrogen leaching, and/or limited nitrogen volatilization, increased organic content.

Figure 6A:
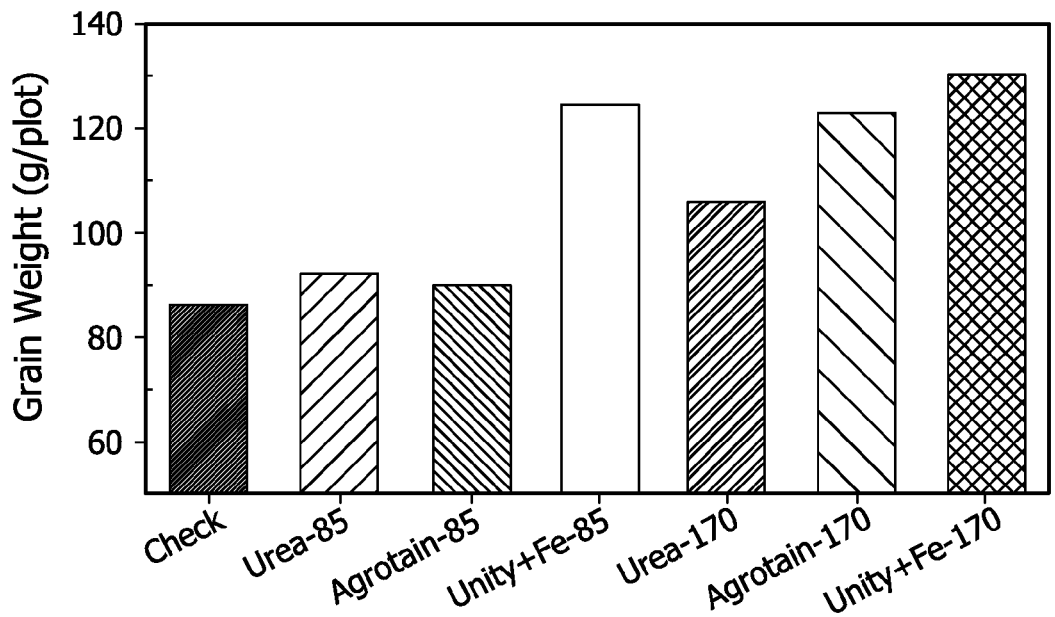
FIGS. 6A and 6B are graphs illustrating data for transplanted rice growth rates using an organically enhanced nitrogen-phosphorous-sulfur fertilizer product as described herein as compared with alternative fertilizers.
Figure 6B:
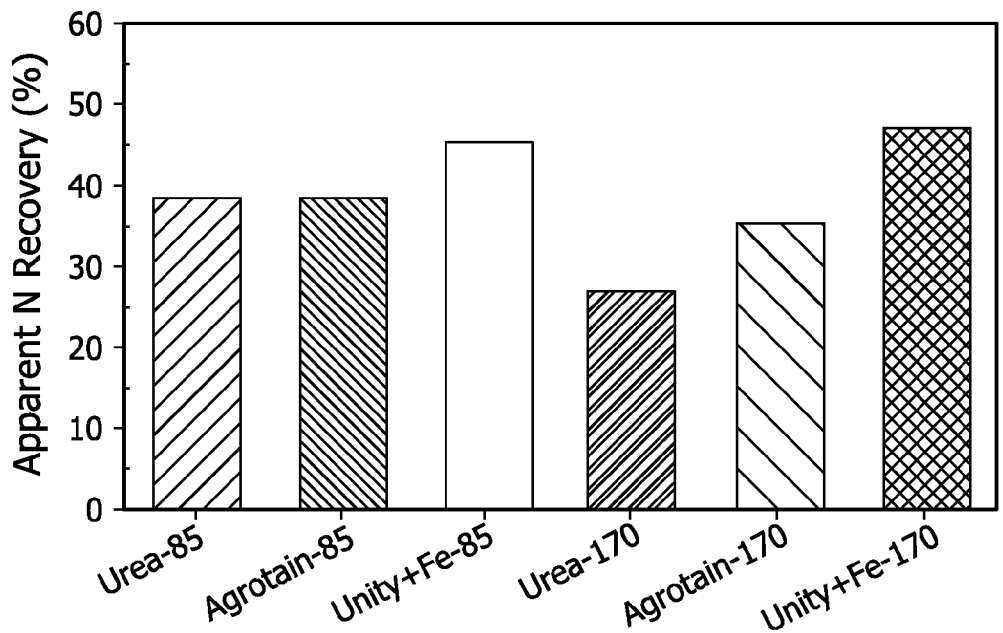

FIGS. 6A and 6B show that the increase in grain weight and grain recovery for transplanted rice was greater using the present granular fertilizer than urea and two other competing products.

Figure 7A:
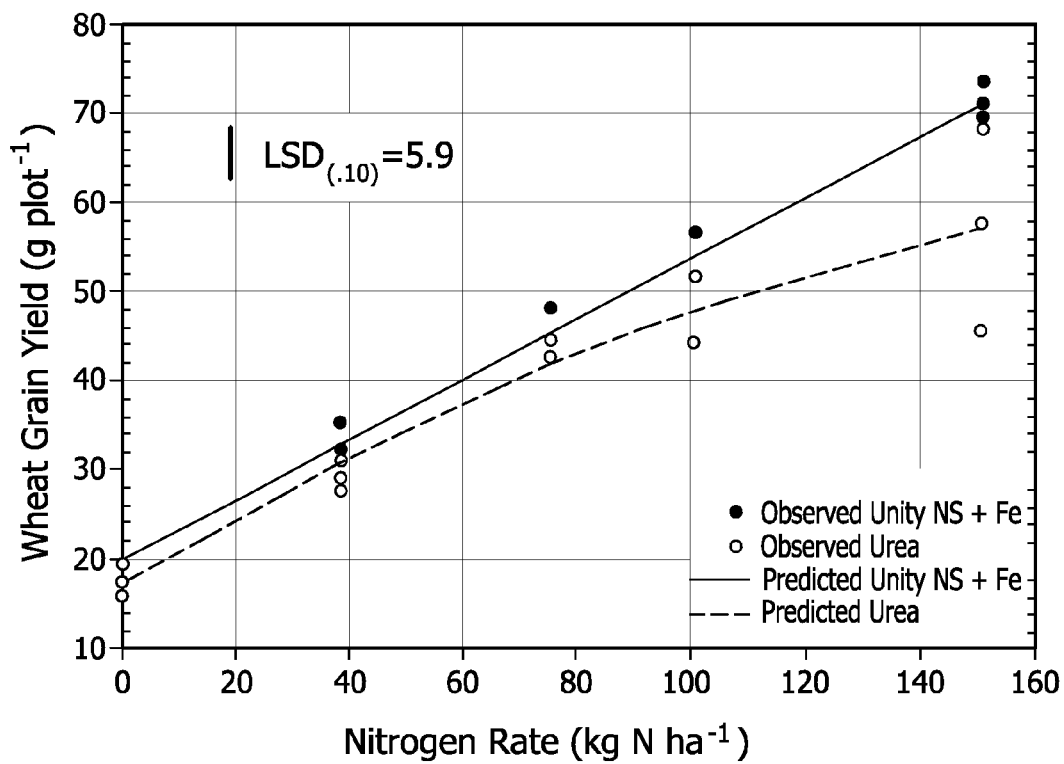
FIGS. 7A, 7B, and 7C are graphs illustrating data for wheat yield using an organically enhanced nitrogen-phosphorous-sulfur fertilizer product as described herein as compared with alternative fertilizers.
Figure 7B:
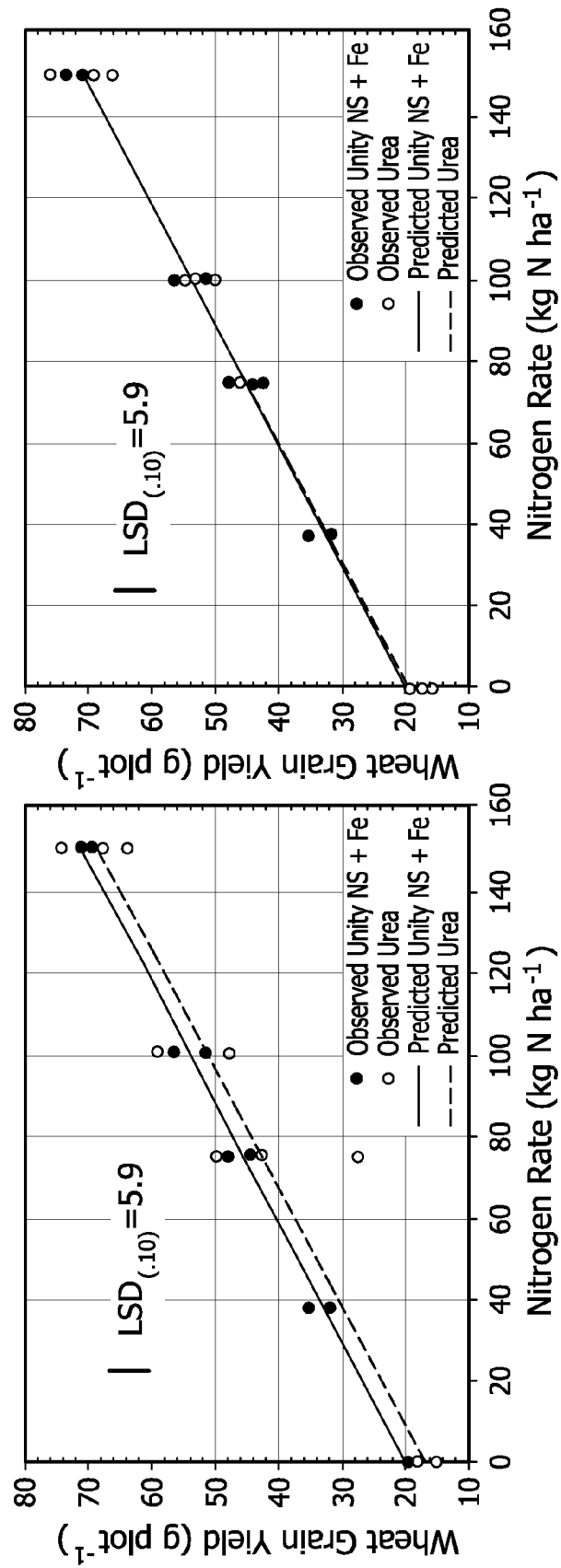
Figure 7C:
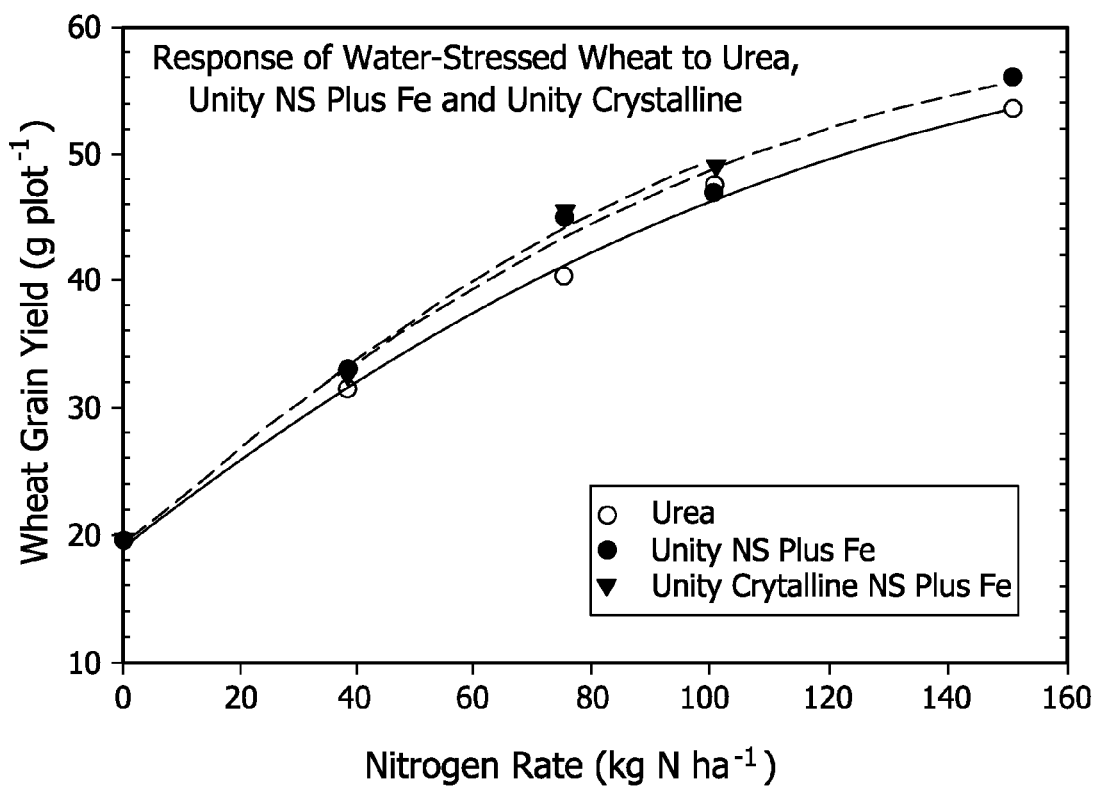

FIGS. 7A, 7B, and 7C similarly show gains in wheat grain yield with the present granular fertilizer that equals or exceeds those using urea and other competing products.

The granular fertilizer has also been used on citrus crops (oranges) in both California and Texas with positive results. Using multiple replications, orange trees were treated at a farm in Southern California with the granular fertilizer or urea at an application rate of 1.5 pounds of (as is) fertilizer per tree. That is, the present granular fertilizer was applied at a rate of 0.255 pounds of N per tree while urea was applied at rate of 0.69 pounds per tree. The present granular fertilizer leached and volatilized less than urea. The results were recorded 126 days after fertilizer treatment and, as shown in Table 4, the present granular fertilizer resulted in faster maturation of the fruit and a 27% increase in juice, a 17% increase in pulp, and a 4.5% increase in sugar (BRIX).

TABLE 4

| Treatment | Chlorophyll | Weight (gm) | Juice (ml) | BRIX (sugar) |
|---|---|---|---|---|
| Present granular fertilizer | 53 | 193 | 46.4 | 9.2 |
| Urea | 51 | 165 | 36.5 | 8.8 |

The granular fertilizer has been tested on Bermuda grass (haymeadow) against NPK Triple 17, and the results are shown in Table 5. The fertilizers were applied (as is) at the rate of 200 lbs/acre. The present granular fertilizer yielded 6% more total dry matter than the NPK control, and the percent crude protein was up from average 15.2% for the NPK control to average of 19.6% for the present fertilizer accreted granules, for a 28.9% improvement. Total Digestible Nutrients (TDN) was up from 64.8 to 79.7, a 23% TDN increase with the present granular fertilizer.

TABLE 5

| Treatment | Dry Matter Yield | Crude Protein % |
|---|---|---|
| Present granular fertilizer | 3086 | 19.6 |
| NOK 17/17/17 | 2903 | 15.2 |

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A process for converting a dewatered heterogeneous sludge containing organic waste materials into a homogenous extract of organic carbon and amino acids to be used in a pipe-reactor granulator fertilizer production process, the conversion process comprising:
    pumping a heterogeneous dewatered sludge including from about 13% to about 45% solids;
    adding sulfuric acid to the sludge in an amount sufficient to cause the pH of the resultant mixture to be less than about 1;
    pumping the mixture through at least one in-line static blending mixer to mix the sludge with the sulfuric acid to reduce the viscosity of the mixture to less than about 5,000 centipoise;
    adding conditioning chemicals to the mixture as needed to obtain a predetermined oxidation reduction potential (ORP), wherein the predetermined ORP is greater than about 250 mV;
    pumping the mixture having the predetermined ORP through at least one in-line static shearing mixer to mix the conditioning chemicals into the mixture, to substantially sterilize the mixture of pathogens, and to substantially eliminate lumps in the mixture; and
    mechanically agitating the mixture for an aging time to create the homogenous extract.

2. The conversion process of claim 1, wherein the predetermined ORP is greater than about 300 mV.

3. The conversion process of claim 1, wherein the extract is substantially odorless.

4. A process according to claim 1, wherein the extract is substantially free of carbon sulfide, carbonyl sulfide, dimethyl disulfide, dimethyl sulfide, ethyl mercaptan, hydrogen sulfide, isopropyl mercaptan, methyl mercaptan, and sulfur dioxide.

5. A process according to claim 1, wherein the extract is substantially free of pathogens.

6. The conversion process of claim 1, wherein the sulfuric acid is added to the sludge at about 5% to about 15% by weight, and wherein the sulfuric acid is at least 93% grade.

7. The conversion process of claim 1, further comprising:
    monitoring the temperature of the mixture downstream of the static blending mixer and adjusting the amount of sulfuric acid to achieve a temperature of at least about 54° C.

8. The conversion process of claim 1, wherein the conditioning chemicals are selected from the group consisting of sulfuric acid, phosphoric acid, acetic acid, peracetic acid, hydrogen peroxide, ferric sulfate, ferrous sulfate, iron ore, aluminum sulfate, zinc sulfate, ground phosphate rock, boron, molybdenum, copper, and combinations thereof.

9. The conversion process of claim 1, further comprising:
    monitoring the temperature, pH, ORP, and viscosity of the mixture downstream of the static shearing mixer and adjusting the rate of sulfuric acid addition to achieve predetermined values of temperature, pH, ORP, and viscosity.

10. The conversion process of claim 1, wherein the amount of sulfuric acid is sufficient to cause the pH of the resultant mixture to be less than or equal to about 1.0.

11. The conversion process of claim 1, wherein the aging time is from about 12 hours to about 72 hours.

12. A sludge conversion system for converting a heterogeneous sludge containing organic waste materials into a homogeneous extract of organic carbon and amino acids to be used in a pipe-reactor granulator fertilizer production system, the conversion system comprising:
    a positive displacement pump configured to pump a dewatered sludge including from about 13% to about 45% solids;
    at least one in-line static blending mixer configured to receive the sludge from the pump and to mix the sludge with sulfuric acid to reduce the pH of the resultant mixture to less than about 1 and the viscosity of the resultant mixture to less than about 5,000 centipoise;
    a process sensor adapted to measure oxidation reduction potential (ORP);
    at least one in-line static shearing mixer configured to receive the mixture from the static blending mixer and, in combination with the process sensor, configured to mix the mixture with conditioning chemicals as needed to obtain a predetermined ORP, wherein the predetermined ORP is greater than about 250 mV, to substantially sterilize the mixture of pathogens, and to substantially eliminate lumps in the mixture;
an aging tank configured to receive the mixture from the in-line static shearing mixer and agitating the mixture to maintain homogeneity of the mixture while the mixture is aged to become the extract; and
a transfer pump configured to deliver the extract from the aging tank to a fertilizer production system.

13. The conversion system of claim 12, wherein the positive displacement pump is selected from the group consisting of a piston pump, a progressive cavity pump, and combinations thereof.

14. The conversion system of claim 12, further comprising a temperature sensor configured to measure the temperature of the mixture downstream of the in-line static blending mixer.

15. The conversion system of claim 12, further comprising another process sensor configured to measure one or more properties selected from the group consisting of the temperature, the pH, and the viscosity of the mixture downstream of the in-line static shearing mixer.

16. A process for converting a dewatered homogeneous sludge containing organic waste materials into a granular fertilizer, the process comprising:

pumping a heterogeneous dewatered sludge including from about 13% to about 45% solids;

adding sulfuric acid to the sludge in an amount sufficient to cause the pH of the resultant mixture to be less than about 1;

pumping the mixture through at least one in-line static blending mixer to mix the sludge with the sulfuric acid to reduce the viscosity of the mixture to less than about 5,000 centipoise;

adding conditioning chemicals to the mixture as needed to obtain a predetermined oxidation reduction potential (ORP), wherein the predetermined ORP is greater than about 250 mV;

pumping the mixture having the predetermined ORP through at least one in-line static shearing mixer to mix the conditioning chemicals into the mixture, to substantially' sterilize the mixture of pathogens, and to substantially eliminate lumps in the mixture;

mechanically agitating the mixture for an aging time to create a homogeneous extract of organic carbon and amino acids;

pumping the extract into a pipe reactor for reaction with an acid and a base to form a melt;

flashing off water from the melt as steam;

rolling the melt onto recycled fine particles to form accreted granules; and drying the accreted granules to form a granular fertilizer.

17. The process of claim 16, wherein, in the pipe reactor, the acid is sulfuric acid and the base is anhydrous ammonia.

18. The process of claim 16, wherein the conditioning chemicals are selected from the group consisting of sulfuric acid, phosphoric acid, acetic acid, peracetic acid, hydrogen peroxide, ferric sulfate, ferrous sulfate, iron ore, aluminum sulfate, zinc sulfate, ground phosphate rock, boron, molybdenum, and combinations thereof.

19. A system for converting a dewatered homogeneous sludge containing organic waste materials into a granular fertilizer, the system comprising:

a positive displacement pump configured to pump a dewatered sludge including from about 13% to about 45% solids;

at least one in-line static blending mixer configured to receive the sludge from the pump and to mix the sludge with sulfuric acid to reduce the pH of the resultant mixture to less than about 1 and the viscosity of the resultant mixture to less than about 5,000 centipoise;

a process sensor configured to measure oxidation reduction potential (ORP);

at least one in-line static shearing mixer configured to receive the mixture from the static blending mixer and, in combination with the process sensor, configured to mix the mixture with conditioning chemicals as needed to obtain a predetermined ORP, wherein the predetermined ORP is greater than about 250 mV, to substantially sterilize the mixture of pathogens, and to substantially eliminate lumps in the mixture;

an aging tank configured to receive the mixture from the in-line static shearing mixer and agitating the mixture to maintain homogeneity of the mixture while the mixture is aged to become the extract;

a transfer pump configured to pump the extract from the aging tank;

a pipe reactor configured to receive the extract from the transfer pump and to mix the extract with an acid and a base to form a melt;

a granulator configured to flash off water from the melt and to roll the melt onto fine particles to form accreted granules; and a dryer to dry the accreted granules to form a granular fertilizer.

20. The system of claim 19, wherein the pipe reactor is a pipe cross reactor.

21. The system of claim 19, wherein, in the pipe reactor, the acid is sulfuric acid and the base is anhydrous ammonia.

22. The system of claim 19, wherein the conditioning chemicals are selected from the group consisting of sulfuric acid, phosphoric acid, acetic acid, peracetic acid, hydrogen peroxide, ferric sulfate, ferrous sulfate, iron ore, aluminum sulfate, zinc sulfate, ground phosphate rock, boron, molybdenum, copper, and combinations thereof.

23. An organically-enhanced granular nitrogen-phosphorous-sulfur fertilizer comprising:

at least about 0.5% by weight of total organic carbon and amino acids; and an accreted granule size greater than or equal to about 1.7 mm;

wherein the fertilizer is noncombustible in a dust cloud combustibility test conducted in accordance with ASTM Standard Test Method E1226, and wherein the fertilizer has an oxidation reduction potential (ORP) of at least about 250 mV.

24. The granular fertilizer of claim 23, wherein the fertilizer is essentially non-self heating.

25. The granular fertilizer of claim 23, wherein the fertilizer is free of pathogens and substantially free of sulfur producing compounds comprising sulfides, disulfides, and mercaptans.

26. The granular fertilizer of claim 25, wherein the fertilizer is substantially free of odor.

27. The granular fertilizer of claim 23, wherein the fertilizer has a critical relative humidity of at least about 80%.

28. The granular fertilizer of claim 23, wherein the fertilizer has a moisture penetration of less than about 1 cm and moisture absorption of less than about 150 mg/cm$^2$.

29. The granular fertilizer of claim 23, wherein the ORP is at least about 300 mV.

30. The granular fertilizer of claim 23, wherein when applied, the fertilizer exhibits low losses of nitrogen from land to water and from land to atmosphere due to leaching and volatilization in exemplary upland and flooded soils.

* * * * *